United States Patent [19]

Katagiri et al.

[11] 4,399,206
[45] Aug. 16, 1983

[54] DISAZO ELECTROPHOTOGRAPHIC PHOTOSENSITIVE MEMBER

[75] Inventors: Kazuharu Katagiri, Mitaka; Katsunori Watanabe, Yamato; Shozo Ishikawa, Sayama; Makoto Kitahara, Yokohama, all of Japan

[73] Assignee: Canon Kabushiki Kaisha, Tokyo, Japan

[21] Appl. No.: 307,154

[22] Filed: Sep. 30, 1981

[30] Foreign Application Priority Data

| Oct. 6, 1980 [JP] | Japan | 55-138717 |
|---|---|---|
| Oct. 9, 1980 [JP] | Japan | 55-140412 |
| Oct. 14, 1980 [JP] | Japan | 55-142505 |
| Oct. 28, 1980 [JP] | Japan | 55-150225 |
| Oct. 28, 1980 [JP] | Japan | 55-150226 |
| Nov. 4, 1980 [JP] | Japan | 55-153815 |

[51] Int. Cl.³ .................... G03G 5/06; G03G 5/14
[52] U.S. Cl. ............................ 430/58; 430/75; 430/77; 260/152; 260/157; 260/158
[58] Field of Search ............... 430/58, 59, 75, 77; 260/152, 157, 158

[56] References Cited

U.S. PATENT DOCUMENTS 3,895,004 7/1975 Montmollin et al. ........ 260/152 X

FOREIGN PATENT DOCUMENTS

| 2460238 | 3/1975 | Fed. Rep. of Germany ...... 260/158 |
| 54-2129 | 1/1979 | Japan ................ 260/157 |
| 55-82160 | 6/1980 | Japan ................ 260/157 |
| 851218 | 10/1960 | United Kingdom . |
| 1068025 | 5/1967 | United Kingdom . |
| 2052082A | 5/1979 | United Kingdom . |
| 2034493A | 6/1980 | United Kingdom . |
| 2034494A | 6/1980 | United Kingdom . |

OTHER PUBLICATIONS

Derwent Abs., 19895w/12, 7/5/75.
Derwent Abs., 74728w/45, 4/3/75.

Primary Examiner—Roland E. Martin, Jr.
Attorney, Agent, or Firm—Fitzpatrick, Cella, Harper & Scinto

[57] ABSTRACT

An electrophotographic photosensitive member is characterized by having a photosensitive layer containing at least one disazo pigment represented by the formula

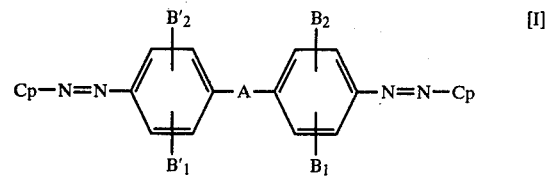

wherein Cp represents a coupler residue; $B_1$, $B_2$, $B_1'$, and $B_2'$ independently of one another represent atoms or groups selected from the group consisting of hydrogen, halogen, lower alkyl, lower alkoxy, acylamino, and hydroxyl; and A represents

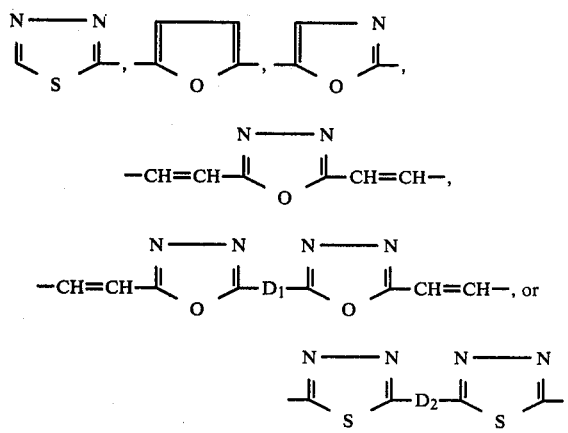

($D_1$ and $D_2$ represent single bond between two

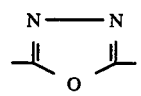

or between two

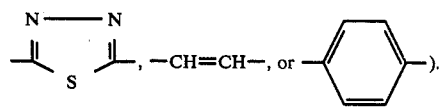

41 Claims, No Drawings

DISAZO ELECTROPHOTOGRAPHIC PHOTOSENSITIVE MEMBER

BACKGROUND OF THE INVENTION

1. Field of the Invention

The present invention relates to electrophotographic photosensitive members and more particularly to those having photosensitive layers containing disazo pigments.

2. Description of the Prior Art

As photoconductive materials for use in electrophotographic photosensitive members, there have been known inorganic substances such as selenium, cadmium sulfide, and zinc oxide. These photoconductive substances have many advantages, for example, chargeability to a suitable potential in a dark place and dischargeability also in a dark place, on the other hand, these have also the following disadavantages. For example, in selenium type photosensitive members, the crystallization of photoconductive substance is readily promoted by heat, moisture, dust, pressure, or other factors, remarkably in particular, when the atmosphere surrounding photosensitive member exceeds a temperature of about 40° C., crystallization is more pronounced, whereby there may be caused such disadvantages as lowering in charge bearing properties or formation of white spots on images. In the cases of selenium type and cadmium sulfide type of photosensitive members, stable durability cannot be secured when being allowed to stand under high humidity conditions. Zinc oxide type of photosensitive members requires the sensitization with sensitizing dyestuff typified by Rose Bengal, which causes the charge deterioration caused by corona charging and colour fading caused by light exposure. Therefore, this type of photosensitive members cannot provide stable images throughout a long period of operation.

On the other hand, various kinds of organic photoconductive polymers including poly (vinylcarbazole) in the first place and low-molecular organic photoconductive substances such as 2,5-bis(p-diethylaminophenyl)-1,3,4-oxadiazole have been proposed. It is difficult to use actually these materials, in spite of their superiority in lightness to the above-said inorganic photoconductive materials. The reason for the unsuccessfulness is that these organic photoconductive substances are inferior to inorganic ones in sensitivity, durability, and stability to the change of surrounding conditions.

SUMMARY OF THE INVENTION

An object of this invention is to provide a novel electrophotographic photosensitive member.

Another object of this invention is to provide an electro photographic photosensitive member of high sensitivity.

A further object of the invention is to provide a novel organic photoconductive substance capable of affording an electrophotographic photosensitive member of high sensitivity.

A still further object of the invention is to provide an electrophotographic photosensitive member having a laminated structure of photosensitive material comprising a charge generation layer and a charge transport layer.

A still further object of the invention is to provide a novel charge-generating material for use in the charge generation layer.

Furthermore, another object of the invention is to provide an electrophotographic photosensitive member having a photosensitive layer containing both a charge-generating material and a charge-transporting material.

According to the present invention, there is provided an electrophotographic photosensitive member characterized by having a photosensitive layer containing at least one disazo pigment represented by the formula

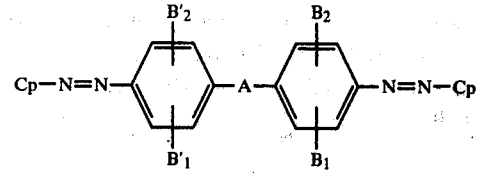

wherein Cp represents a coupler residue; $B_1$, $B_2$, $B_1'$ and $B_2'$ independently of one another represent atoms or groups selected from the group consisting of hydrogen, halogen, lower alkyl, lower alkoxy, acylamino, and hydroxyl; and A represents

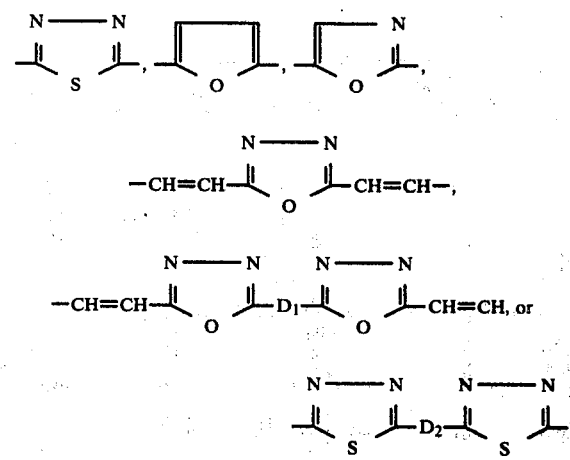

($D_1$ and $D_2$ represent single bond between two

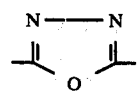

or between two

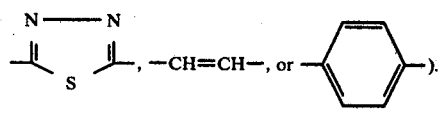

DESCRIPTION OF THE PREFERRED EMBODIMENTS

This invention is based on the finding that a very useful photosensitive member or electrophotography is obtained by using a novel disazo pigment in its photosensitive layer, which is represented by the formula

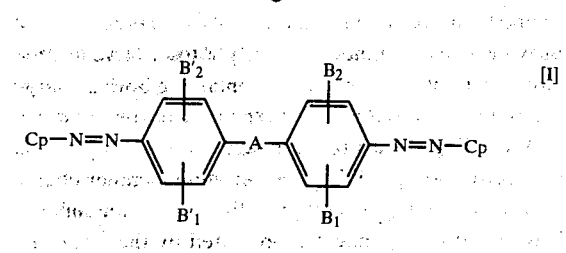

wherein Cp represents a coupler residue; $B_1$, $B_2$, $B_1'$, and $B_2'$ independently of one another represent atoms or groups selected from the group consisting of hydrogen, halogen, lower alkyl, lower alkoxy, acylamino, and hydroxyl; and A represents

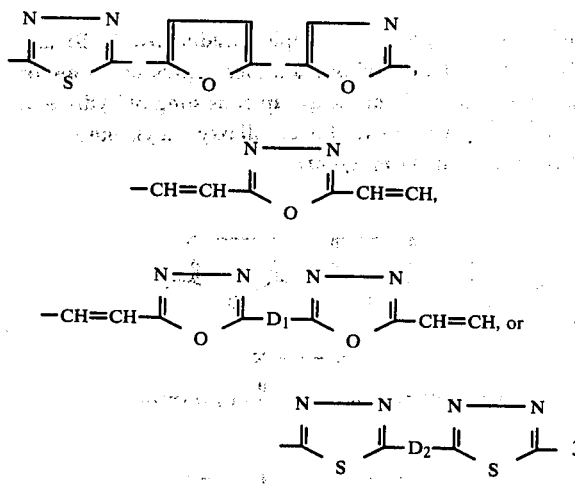

($D_1$ and $D_2$ represent single bond between two

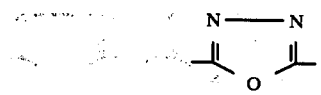

or between two

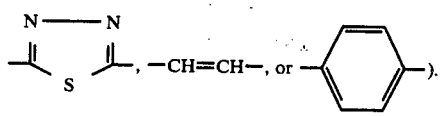

Cp in formula [1] shown above is desirable to be selected from coupler residues represented by the following formula (A), (B), (C), or (D):

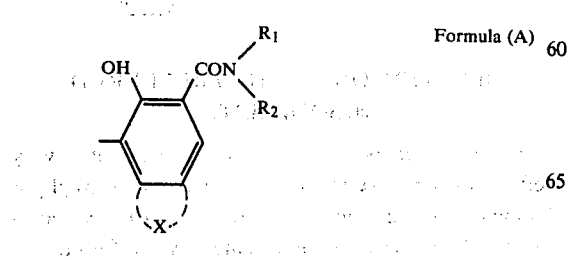

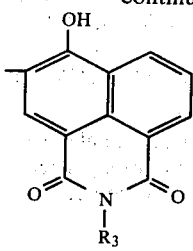

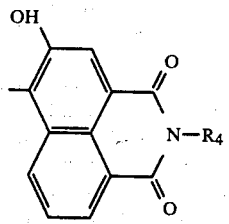

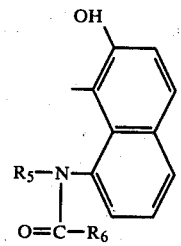

In formula (A), X represents an atom group, or together with the benzene in association with ring which links X, naphthalene ring, anthracene ring, carbazole ring or dibenzafuran ring; $R_1$ is hydrogen, substituted or unsubstituted alkyl, or substituted or unsubstituted aryl; $R_2$ is substituted or unsubstituted alkyl, substituted or unsubstituted aralkyl, or substituted or unsubstituted aryl. For example, said alkyl represented by $R_1$ or $R_2$ includes methyl, ethyl, n-propyl, isopropyl, n-butyl, sec-butyl, t-butyl, n-amyl, sec-amyl, t-amyl, n-hexyl, n-octyl, 2-ethylhexyl and the like; said aralkyl represented by $R_2$ includes benzyl, phenethyl, α-naphthylmethyl, β-naphthylmethyl, and the like; and said aryl represented by $R_1$ or $R_2$ includes phenyl, α-naphthyl, β-naphthyl, and the like.

These alkyl, aralkyl, and aryl may have a substituent including halogen such as fluorine, chlorine, bromine, and the like, alkoxy such as methoxy, ethoxy, propoxy, butoxy, and the like, acyl such as acetyl, propionyl, butyryl, benzoyl, toluoyl, and the like, alkylthio such as methylthio, ethylthio, propylthio, butylthio, and the like, arylthio such as phenylthio, tolylthio, xylylthio, biphenylthio, and the like, nitro, cyano, and alkylamino such as dimethylamino, diethylamino, dipropylamino, dibutylamino, methylamino, ethylamino, propylamino, butylamino, and the like. Said alkyl, aralkyl, or aryl may have these substituents singly or in combination of two or more, and further said aralkyl or aryl may have as substituents also one or more alkyls such as methyl, ethyl, n-propyl, isopropyl, n-butyl and t-butyl along with or without one or more of groups or the substituents enumerated above.

Among the coupler residues represented by formula (A) above, particularly preferred are those represented by the formula

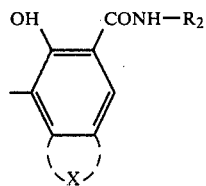

wherein X and R₂ are as defined above.
In formulas (B) and (C),

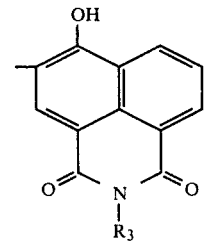

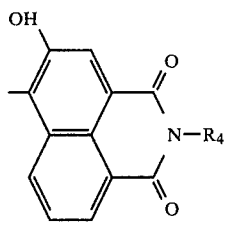

R₃ and R₄ represent substituted or unsubstituted alkyl, substituted or unsubstituted aralkyl, substituted or unsubstituted aryl, or alkylamino. More specifically, R₃ and R₄ include linear or branched alkyls such as methyl, ethyl n-propyl, isopropyl, n-butyl, sec-butyl, t-butyl, n-amyl, t-amyl, and the like; hydroxyalkyls such as hydroxymethyl, 2-hydroxyethyl, 3-hydroxypropyl, 4-hydroxybutyl, and the like; alkoxyalkyls such as methoxymethyl, 2-methoxyethyl, 3-methoxypropyl, 4-methoxybutyl, ethoxymethyl, 2-ethoxyethyl, 3-ethoxypropyl, 4-ethoxybutyl, and the like; cyanoalkyls such as cyanomethyl, 2-cyanoethyl,-3-cyanopropyl, 4-cyanobutyl, and the like; N-alkylaminoalkyls such as N-methylaminomethyl, 2-N-methylaminoethyl, 3-N-methylaminopropyl, 4-N-methylaminobutyl, 2-N-ethylaminoethyl, and the like; N-N-dialkylaminoalkyls such as N-N-dimethylaminomethyl, N-N-diethylaminomethyl, N-N-dipropylaminomethyl, 2-N,N-dimethylaminoethyl, 3-N,N-dimethylaminopropyl, 4-N,N-dimethylaminobutyl, and the like; haloalkyls such as chloromethyl, 2-chloroethyl, 3-chloropropyl, 4-chlorobutyl, 2-bromoethyl, 4-bromobutyl, and the like; aralkyls such as benzyl, methoxybenzyl, chlorobenzyl, dichlorobenzyl, cyanobenzyl, phenethyl, α-naphthylmethyl, β-naphthylmethyl, and the like; unsubstituted aryls such as phenyl, α-naphthyl, β-naphthyl, and the like; aryls such as phenyl, α-naphthyl, β-naphthyl, and the like substituted by the substituent mentioned in R₁ and R₂ of the formula (A); and alkylaminos such as methylamino, ethylamino, propylamino, butylamino, dimethylamino, diethylamino, dipropylamino, and dibutylamino.

In formula (D)

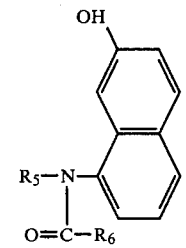

R₅ represents hydrogen, substituted or unsubstituted alkyl, substituted or unsubstituted aralkyl or substituted or unsubstituted aryl, and R₆ represents substituted or unsubstituted aryl. These alkyl and aryl include the same substituted or unsubstituted alkyls and substituted or unsubstituted aryls, respectively, as the cited examples or R₁ and R₂ in formula (A) above, and the substituted or unsubstituted aralkyl includes benzyl, methoxybenzyl, dimethoxybenzyl, chlorobenzyl, dichlorobenzyl, trichlorobenzyl, phenethyl, α-naphthylmethyl, and β-naphthylmethyl.

Among the coupler residues represented by formula (D), particularly preferred are those represented by the following formula:

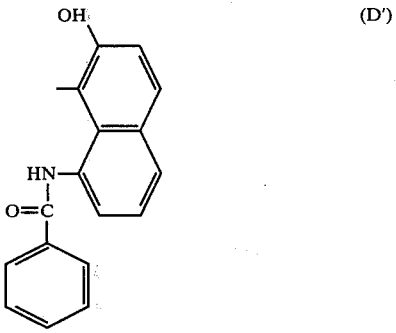

B₁, B₂, B₁', and B₂' in formula [1] are selected from the group consisting of hydrogen; halogens such as chlorine, bromine, and iodine; lower alkyls such as methyl, ethyl, n-propyl, isopropyl, n-butyl, sec-butyl, t-butyl, n-amyl, t-amyl, and the like; lower alkoxyls such as methoxy, ethoxy, propoxy, butoxy, and the like; acylaminos such as acetylamino, propionylamino, butyrylamino, benzoylamino, toluoylamino, and the like; and hydroxyl.

Particularly desirable disazo pigments preferably used in the electrophotographic photosensitive member of this invention are those represented by the following formulas [II]–[VII]:

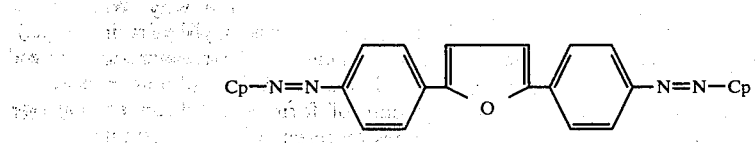

[II]

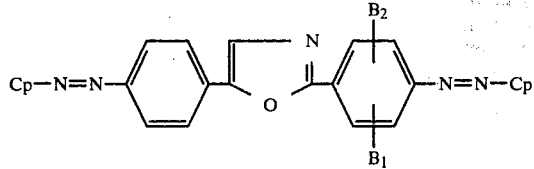
[III]

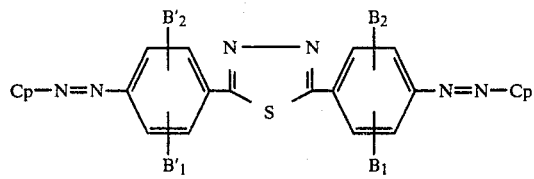
[IV]

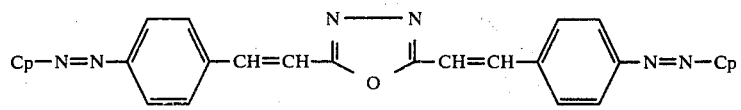
[V]

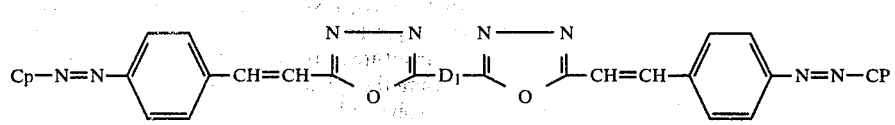
[VI]

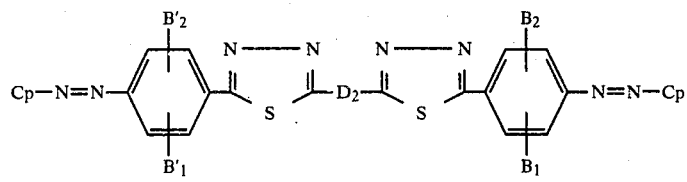
[VII]

In these formulas, $C_p$, $B_1$, $B_2$, $B_1'$, $B_2'$, $D_1$, and $D_2$ are as defined above.

Examples of these compounds will be manifested in the examples of embodiments of the invention stated later.

Disazo pigments represented by formula [II] can be readily prepared in the following way:

Conversion of a starting compound diamine represented by the formula

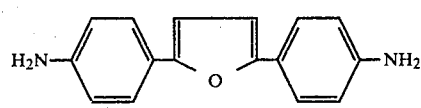

to tetrazonium salt thereof by the usual method, followed by coupling thereof with a specific coupler in the presence of alkali, or by coupling thereof in a suitable solvent such as, e.g., N,N-dimethylformamide or dimethylsulfoxide in the presence of alkali after the tetrazonium salt has been isolated in the form of borofluoride or of double salt with zinc chloride.

In this way, other disazo pigments of formulas [III]–[VII] can also be readily prepared from the following types of diamines, respectively:

Disazo pigments of formula [III] can be prepared from the diamines represented by the formula

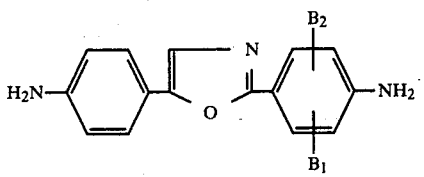

wherein $B_1$ and $B_2$ are as defined above.

Disazo pigments of formula [IV] can be prepared from the diamines represented by the formula

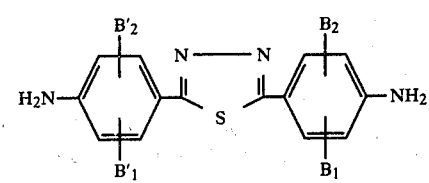

wherein $B_1$, $B_2$, $B_1'$ and $B_2'$ are as defined above.

Disazo pigments of formula [V] can be prepared from the diamines prepared by reducing 2,5-bis(p-nitrostyryl)-1,3,4-oxadiazole in the usual way, which is obtained by heating bis(p-nitrostyroyl)hydrazine in polyphosphoric acid or heating p-nitrocinnamic acid and hydrozine-mineral acid salt in polyphophoric acid.

Disazo pigments of formula [VI] can be prepared from the diamines represented by the formula

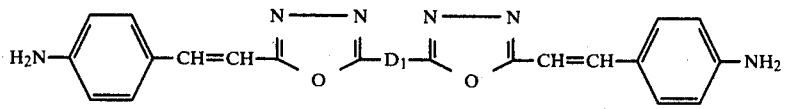

wherein $D_1$ is as defined above.

Disazo pigments of formula [VII] can be prepared from the diamines represented by the formula

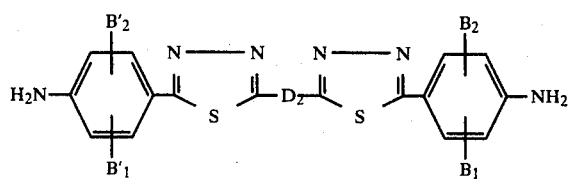

wherein $B_1$, $B_2$, $B_1'$, $B_2'$ and $D_2$ are as defined above. This bisthiadiazolediamines can be synthesized by the method of French Pat. No. 1284760(1963).

An example of process for synthesizing a disazo pigment used in this invention will be illustrated below.
Synthetic Process Example
Synthesis of the following:

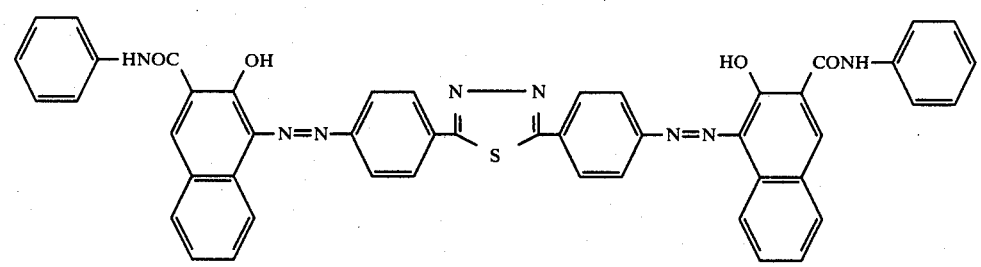

A dispersion prepared from 10.0 g of (0.0373 mol) 2,5-di-(p-aminophenyl)-1,3,4-thiadiazole, 21.7 ml (0.246 mol) of concentrated hydrochloric acid, and 120 ml of water was cooled to 3° C., and a solution of 5.4 g (0.0783 mol) of sodium nitrite in 20 ml of water was added dropwise thereto in the course of one hour while keeping the temperature not to exceed 5° C. Stirring for further one hour at the same temperature, addition of active carbon, and filtration gave an aqueous solution of tetrazonium salt.

The tetrazonium solution was dropped to a solution prepared by dissolving 32.8 g of caustic soda and 21.6 g (0.082 mol) of 2-hydroxy-3-naphthoic acid anilide in 970 ml of water, in the course of 40 minutes while keeping the temperature at 4°-7° C. After further two-hours stirring and overnight standing, the reaction mixture was filtered. The pigment obtained was washed with water and then with acetone and dried, giving 28.1 g of crude pigment.

Then, through washing the crude pigment with dimethylformamide and tetrahydrofuran successively, 20.6 g of purified pigment was obtained.

| | |
|---|---|
| Yield from the starting diamine: | 67.7% |
| Decomposition point: | ≧300° C. |
| Visible absorption spectrum: | λmax = 568nm |
| | (o-dichlorobenzene solution) |
| IR absorption spectrum: | 1675 cm$^{-1}$ |
| | (sec-amide) |
| Elemental analysis: | |
| Calcd. for $C_{48}H_{32}N_8O_4S$ | Found |

| -continued | | |
|---|---|---|
| | (%) | (%) |
| C | 70.57 | 70.48 |
| H | 3.96 | 4.01 |
| N | 13.72 | 13.65 |

Other diazo pigments used in this invention can be synthesized in the same manner as this process of synthesizing pigment No.43.

The electrophotographic photosensitive member of this invention is preferably of a type (1)–(3) shown below, though it may be of any type as long as it contains disazo pigments of formula [I] in its photosensitive layer.

(1) A member having a layer containing a pigment dispersed in a charge transport medium comprising a charge-transporting material and an insulating binder (the binder itself may also be a charge-transporting material) is provided on a conductive layer.

(2) A member comprising a conductive layer, a charge generation layer containing an organic pigment, and a charge transport layer.

(3) A member comprising a charge-transfer complex to which an organic pigment has added.

In particular, when a disazo pigment of formula [I] is employed as a charge generation material in the charge generation layer of a photosensitive member of type (2) above, that is, a member comprising two separate layers, namely, a charge generation and a charge transport, the photosensitive member has a good sensitivity and low residual potential. In this case, it is also possible to inhibit its sensitivity drop and rise of residual potential to an extent actually negligible during repeated use. Accordingly, the photosensitive member of type (2) will be described in detail.

A conductive layer, charge generation layer, and charge transport layer are essential for the layer structure of this type of photosensitive member. Although the charge generation layer may be laid either over or below the charge transport layer, electrophotographic photosensitive members to be used repeatedly are preferred to have a conductive layer, a charge generation layer overlaid on the conductive layer, and a charge transport layer overlaid on the charge generation layer, primarily in view of mechanical strength and in certain cases in view of charge bearing characteristics. A bond layer may be laid, if necessary, between the conductive and charge generation layers for the purpose of improving the adhesion.

Any type of conventional conductive layers may be used so far as it has conductivity.

As a material for the bond layer, there may be used various conventional binders such as casein, poly(vinyl alcohol), and the like. Thickness of the bond layer is 0.5–5μ, preferably 0.5–3μ.

A disazo pigment of formula [I], after finely pulverized, without a binder or if necessary, with itself dispersed in a suitable binder solution, is coated on the conductive layer or on the bond layer to dry the applied coating. For preparation of the dispersion of disazo pigment, known devices such as ball mills, attritor and the like can be used and the dispersed pigment particle size is reduced to 5μ or less, preferably 2μ or less, and most preferably 0.5μ or less.

The disazo pigment can be coated also with itself dissolved in an amine type solvent such as ethylenediamine. The usual method such as blade coating, Meyer bar coating, spraying, or dipping can be applied to this coating.

Thickness of the charge generation layer is 5μ or less, preferably 0.05–1μ. When a binder is incorporated in the charge generation layer, the binder content therein is desirable to be not more than 80%, preferably up to 40%. The binders usable in this case include various resins such as poly(vinyl butyral), polyester, and the like.

Thickness of the charge transport layer provided on said charge generation layer is 5–30μ, preferably 8–20μ.

The charge transport materials used in the charge transport layer include electron-transporting materials and hole-transporting materials.

The usable electron-transporting materials include, for example, electron-attracting materials including: chloranil, bromanil, tetracyanoethylene, tetracyanoquinodimethane; fluorenone derivatives such as 2,4,7-trinitro-9-fluorenone, 2,4,5,7-tetranitro-9-fluorenone, 2,4,7-trinitro-9-dicyanomethylenefluorenone, and the like; 2,4,5,7-tetranitroxanthone, and 2,4,8-trinitrothioxanthone; and polymess made of the above-mentioned electron-attracting substances.

The usuable hole-transporting materials include, for example, N-methyl-N-phenylhydrazino-3-methylidene-9-ethylcarbazole, N,N-diphenylhydrazino-3-methylidene-9-ethylcarbazole; hydrazones such as p-dimethylaminobenzaldehyde-N,N-diphenylhydrazone, p-diethylaminobenzaldehyde-N,N-diphenylhydrazone, p-dipropylaminobenzaldehyde-N,N-diphenylhydrazone, p-dibenzylaminobenzaldehyde-N,N-diphenylhydrazone, and p-pyrrolidinobenzaldehyde-N,N-diphenylhydrazone; pyrazolines such as 1-phenyl-3-(p-diethylaminostyryl)-5-(p-diethylaminophenyl)pyrazoline, 1-[pyridyl-(2)]-3-(p-dimethylaminostyryl)-5-(p-dimethylaminophenyl)pyrazoline, 1-[pyridyl-(2)]-3(p-diethylaminostyryl)-5-(p-diethylaminophenyl)pyrazoline, 1-[pyridyl-(2)]-3-(p-dipropylaminostyryl)-5-(p-dipropylaminophenyl)pyrazoline, 1-[pyridyl-(2)]-3-(p-dibutylaminostyryl)-5-(p-dibutylaminophenyl)pyrazoline, 1-[pyridyl-(2)]-3-(p-dibenzylaminostyryl)-5-(p-dibenzylaminophenyl)pyrazoline, 1-[pyridyl-(3)]-3-(p-dimethylaminostyryl)-5-(p-dimethylaminophenyl)-pyrazoline, 1-[pyridyl-(3)]-3-(p-diethylaminostyryl)-5-(p-diethylaminophenyl)pyrazoline, 1-[pyridyl-(3)]-3-(p-dipropylaminostyryl)-5-(p-dipropylaminophenyl)-pyrazoline, 1-[6-methoxypyridyl-(2)]-3-(p-diethylaminostyryl)-5-(p-diethylaminophenyl)pyrazoline, 1-[quinolyl-(2)]-3-(p-dimethylaminostyryl)-5-(p-dimethylaminophenyl)pyrazoline, 1-[quinolyl-(2)]-3-(p-diethylaminostyryl)-5-(p-diethylaminophenyl)pyrazoline, 1-[lepidyl-(2)]-3-(p-diethylaminostyryl)-5-(p-diethylaminophenyl)pyrazoline, 1,3,5-triphenylpyrazoline, and the like; oxadiazoles such as 2,5-bis(p-dimethylaminophenyl)-1,3,4-oxadiazole, 2,5-bis(p-diethylaminophenyl)-1,3,4-oxadiazole, 2,5-bis(p-dipropylaminophenyl)-1,3,4-oxadiazole, 2,5-bis(p-dibenzylaminophenyl)-1,3,4-oxadiazole, and the like; oxazoles such as 2-(p-dimethylaminostyryl)-6-dimethylaminobenzoxazole, 2-(p-diethylaminostyryl)-6-diethylaminobenzoxazole, 2-(p-dipropylaminostyryl)-6-dipropylaminobenzoxazole, 2,4-di-(p-dimethylaminophenyl)-5-(2-chlorophenyl)oxazole, 2-(p-diethylaminophenyl)-4-(p-dimethylaminophenyl)-5-(2-chlorophenyl)oxazole, and the like; thiazoles such as 2-(p-dimethylaminostyryl)-6-dimethylaminobenzothiazole, 2-(p-diethylaminostyryl)-6-diethylaminobenzothiazole, 2-(p-dipropylaminostyryl)-6-dipropylaminobenzothiazole, 2-styryl-6-diethylaminobenzothiazole, 2-(p-dibenzylaminostyryl)-6-dibenzylaminobenzothiazole, and the like; triarylmethanes such as bis(p-dimethylamino-2-methylphenyl)phenylmethane, bis(p-diethylamino-2-methylphenyl)-phenyl-methane, bis(p-dibenzylamino-2-methylphenyl)-phenyl-methane, and the like; and carbazole compounds such as poly(N-vinylcarbazole), halogenated poly(N-vinylcarbazole), ethylcarbazole-formaldehyde resin, N-ethylcarbazole, N-isopropylcarbazole, and the like. In addition, other hole-transporting materials can also be used, such as pyrene, triphenylamine, poly(vinylpyrene), poly(vinylanthracene), poly(vinylacrylidine), poly(9-vinylphenylanthracene), pyrene-formaldehyde resin, and the like. However, usable charge-transporting materials are not limited to the compounds cited above, the two or more charge-transporting compounds can be used in combination.

Since low-molecular charge-transporting materials do not have film-forming ability, they are each dissolved along with one of various binder resins in a suitable solvent, and the solution is coated in the usual way and dried to form a charge transport layer.

Various conventional binders including acrylic resin, polycarbonate resin, phenoxy resins, and the like can be used for this purpose. A binder having in itself charge-transporting ability may also be used.

When operating a photosensitive member comprising a conductive layer, a charge generation layer, and a charge transport layer, the layers being laminated in the above-mentioned order wherein the charge transport material comprises an electron-transporting material, it is necessary to charge positively the surface of the charge transport layer. Upon exposing the photosensitive member to a pattern of light after positive charging, electrons produced in the exposed areas of the charge generation layer are injected into the charge transport layer, then reach at the surface and neutralize positive charges to decay the surface potential. Thus, an electrostatic contrast is produced between the exposed and unexposed areas. For visualizing the latent image, various conventional developing processes can be applied.

On the other hand, in the case where the charge transport material comprises a hole-transporting material, the surface of the charge transport layer must be negatively charged.

This invention can be effectively applied also to photosensitive members of types (1) and (3) mentioned above. A photosensitive member of type (1) can be prepared by forming, on a conductive layer, a layer comprising a dispersion of a disazo pigment of formula [I] in a binder such as, for example, polystyrene, polycarbonate, acrylic resin, and poly(N-vinylcarbazole) which contains a charge-transporting material as mentioned above. A photosensitive member of type (2) can be prepared by forming, on a conductive layer, a layer containing a disazo pigment of formula [I] and a charge-transfer complex made of electron-accepting and electron-donating substances. These types of photosensitive members will be illustrated in the examples stated later.

Electrophotographic photosensitive members of this invention can be used not only in electrophotographic copying machines but also extensively in electrophotographic application fields such as those of laser printers, CRT printers, electrophotographic printing plate making systems, and the like.

Now, examples of embodiments of this invention are given.

EXAMPLE 1

A solution of casein in aqueous ammonia was coated on an aluminum plate of 100μ in thickness to form a bond layer of 1.0 g/m² after drying.

Then, a dispersion prepared from 5 g of pigment No.1, having the structure the charge bearing characteristics. The results were as follows:

Vo: ⊖ 590 V; Vk: 91%; E ½: 8.91 lux.sec, wherein Vo is original potential, Vk is potential retentivity after standing for 10 seconds in a dark place, and E ½ is exposure quantity for halving original potential.

Measurements of charge bearing characteristics of the photosensitive members in the following examples were all carried out in the same way as mentioned above, and the symbols ⊕ and ⊖ indicate positive and negative charging, respectively.

EXAMPLE 2

A solution prepared by dissolving 5 g of 2,4,7-trinitro-9-fluorenone and 5 g of poly[2,2-bis(4-hydroxyphenyl)propane]-carbonate (M.W. about $3.0 \times 10^4$), i.e., poly(carbonate of bisphenol A) (hereinafter, referred to simply as polycarbonate) in 70 ml of THF was coated on the charge generation layer prepared in Example 1, to form a charge transport layer of 10 g/m² after drying.

Charge bearing characteristics of the photosensitive member thus prepared were as follows:

Vo: ⊕ 520 V; Vk: 88%; E ½: 16.2 lux.sec

EXAMPLES 3–18

An aqueous solution of poly(vinyl alcohol) was

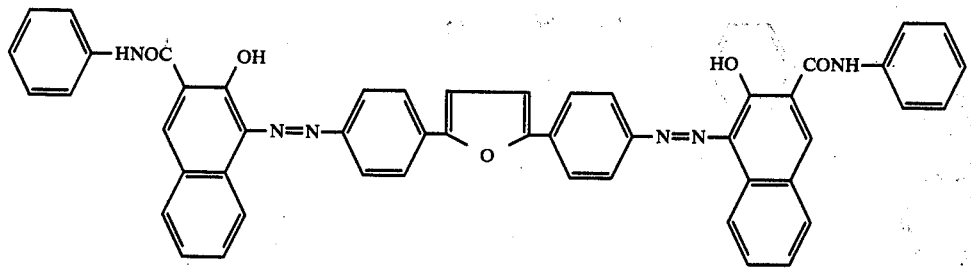

10 g of a polyester resin solution (trade name: Polyester Adhesive 49,000, 20% solids, manufd. by Du Pont de Numerous, E. I., & Co.), and 80 ml of tetrahydrofuran (hereinafter referred to as THF) was coated on said bond layer to form a charge generation layer of 0.25 g/m² after drying.

Further, a solution prepared by dissolving 5 g of 2,5-bis(p-diethylaminophenyl)-1,3,4-oxadiazole and 5 g of poly(methylmethacrylate)resin (M.W. about $1.0 \times 10^5$) in 70 ml of THF was coated on said charge generation layer to form a charge transport layer of 10 g/m² after drying.

The electrophotographic photosensitive member thus prepared was subjected to corona-discharge of ⊖ 5 KV in the electrostatic process by using an electrostatic copying paper test machine (Model SP-428, manufd. by Kawaguchi Denki K.K.), retained for 10 seconds in a dark place, and then exposed to light at 5 lux to examine coated on the aluminum surface of a Mylar film vacuum metallized with aluminium, to form a bond layer of 1.2 g/m² after drying.

Then, 5 g of each disazo pigment represented by formula [II] of which Cp is shown in Table 1 was dispersed in a solution of 2 g of a poly(vinyl butyral) resin (degree of butyral conversion: 63 mol %) in 95 ml of ethanol, and the resulting dispersion was coated on said bond layer to form a charge generation layer of 0.2 g/m² after drying.

Further, a solution prepared by dissolving 5 g of 1-phenyl-3-(p-diethylaminostyryl)pyrazoline and 5 g of the same polycarbonate as used in Example 2 in 70 ml of THF was coated on said charge generation layer to form a charge transport layer of 11 g/m² after drying.

Charge bearing characteristics of the photosensitive members prepared in this way are shown in Table 1.

TABLE 1
| Example No. | Pigment No. | Cp in formula [II] | Vo (−V) | Vk (%) | E½ (lux·sec) |
|---|---|---|---|---|---|
| 3 | 2 | 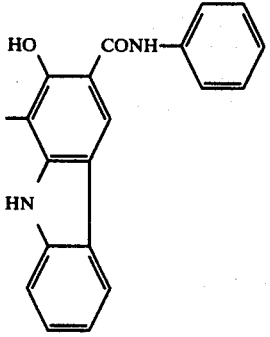 | 560 | 89 | 9.1 |
| 4 | 3 | 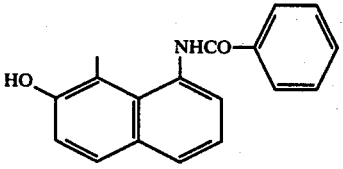 | 550 | 90 | 10.6 |
| 5 | 4 | 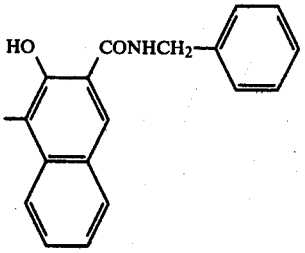 | 600 | 94 | 14.8 |
| 6 | 5 | 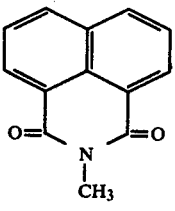 | 580 | 91 | 8.9 |
| 7 | 6 | 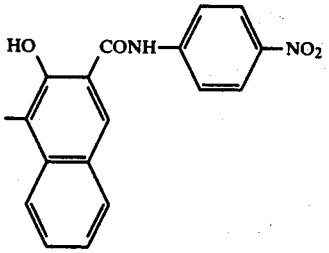 | 590 | 93 | 14.6 |

TABLE 1-continued

| Example No. | Pigment No. | Cp in formula [II] | Charge bearing characteristics | | |
|---|---|---|---|---|---|
| | | | $V_o$ (−V) | $V_k$ (%) | $E_{\frac{1}{2}}$ (lux·sec) |
| 8 | 7 | (3-hydroxy-4-methyl-7-methyl-2-naphthamide with N-(2-methoxy-4-chloro-5-methoxyphenyl)) | 580 | 89 | 13.2 |
| 9 | 8 | (3-hydroxy-4-methyl-2-naphthamide with N-(2-methyl-4-methylphenyl)) | 570 | 88 | 10.9 |
| 10 | 9 | (hydroxy-methyl benzanthrone imide with N-CH₃) | 560 | 90 | 9.5 |
| 11 | 10 | (3-hydroxy-4-methyl-2-naphthamide with N-(1-naphthyl)) | 590 | 93 | 13.9 |
| 12 | 11 | (3-hydroxy-4-methyl-2-naphthamide with N-CH₃) | 610 | 92 | 6.9 |

TABLE 1-continued

| Example No. | Pigment No. | Cp in formula [II] | Vo (−V) | Vk (%) | E½ (lux · sec) |
|---|---|---|---|---|---|
| 13 | 12 | OH, CONH—$C_2H_5$ (naphthalene) | 580 | 89 | 9.7 |
| 14 | 13 | OH, CONH—$C_3H_7(n)$ (naphthalene) | 580 | 90 | 8.0 |
| 15 | 14 | OH, CONH—$C_6H_{13}(n)$ (naphthalene) | 590 | 92 | 8.3 |
| 16 | 15 | OH, CONH—$C_8H_{17}(n)$ (naphthalene) | 590 | 91 | 10.5 |
| 17 | 16 | OH, CON($CH_3$)—$CH_3$ (naphthalene) | 590 | 89 | 7.9 |
| 18 | 17 | OH, CON($C_2H_5$)—$C_2H_5$ (naphthalene) | 600 | 92 | 8.3 |

EXAMPLE 19

After 1.0 g of pigment No.2, which was used in Example 3, was dispersed in a solution prepared by dissolving 5 g of p-pyrrolidinobenzaldehyde-N,N-diphenylhydrazine and 5 g of poly(N-vinylcarbazole) (M.W. about $3.0 \times 10^5$) in 70 ml of THF, the resulting dispersion was coated on the same bond layer of the Milar film vacuum metallized with aluminum as used in Example 3 to form a photosensitive layer of 10 g/m² after drying.

Charge bearing characteristics of this photosensitive member were as follows:

Vo: ⊕ 500 V; Vk: 91%; E ½: 18.8 lux.sec

EXAMPLE 20

An aqueous solution of poly(vinyl alcohol) was coated on an aluminum plate of 100μ in thickness to form a bond layer of 1.0 g/m² after drying.

After 1.0 g of pigment No.18, having the structure

A solution prepared by dissolving 5 g of p-diethylaminobenzaldehyde-N,N-diphenylhydrazone and 5 g of the poly(methylmethacrylate) mentioned above (Example 1) in 70 ml of THF was coated on said charge generation layer to form a charge transport layer of 10 g/m² after drying.

Charge bearing characteristics of this photosensitive

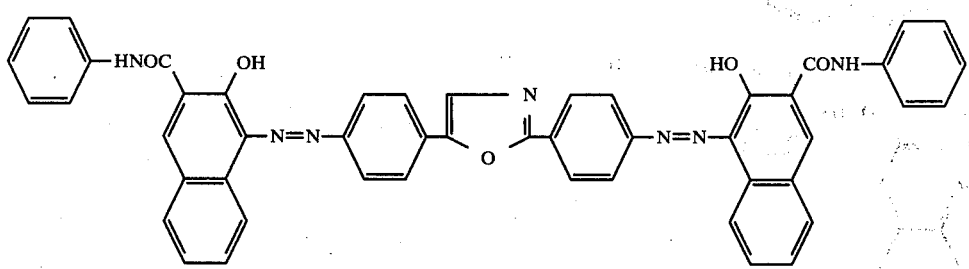

was dispersed in a solution prepared by dissolving 5 g of 1-phenyl-3-(p-diethylaminostyryl)-5-(p-diethylaminophenyl)pyrazoline and 5 g of the above-mentioned poly(N-vinylcarbazole) in 70 ml of THF, the resulting dispersion was coated on said bond layer to form a photosensitive layer of 11 g/m² after drying.

Charge bearing characteristics of this photosensitive member were as follows:

Vo: ⊕ 500 V; Vk: 89%; E ½: 18.4 lux.sec

EXAMPLE 21

A solution of casein in aqueous ammonia was coated on the aluminum surface of a Mylar film vacuum metallized with aluminum, to form a bond layer of 1.3 g/m² after drying.

Then, a dispersion prepared from 5 g of pigment No.19, having the structure member were as follows:

Vo: ⊖ 580 V; Vk: 90%; E ½: 9.8 lux.sec

EXAMPLES 22–44

After 5 g of each disazo pigment represented by formula [II] of which Cp, $B_1$, and $B_2$ are shown in Table 2 was dispersed in a solution of 2 g of poly(vinyl butyral) resin mentioned above (Examples 3–18) in 95 ml of ethanol, the resulting dispersion was coated on the aluminum surface of a Mylar film vacuum metallized with aluminum, to form a charge generation layer of 0.15 g/m² after drying.

Then, a solution prepared by dissolving 5 g of 2,5-bis(p-diethylaminophenyl)-1,3,4-oxadiazole and 5 g of the polycarbonate mentioned above (Example 2) in 70 ml of THF was coated on said charge generation layer to form a charge transport layer of 10 g/m² after drying.

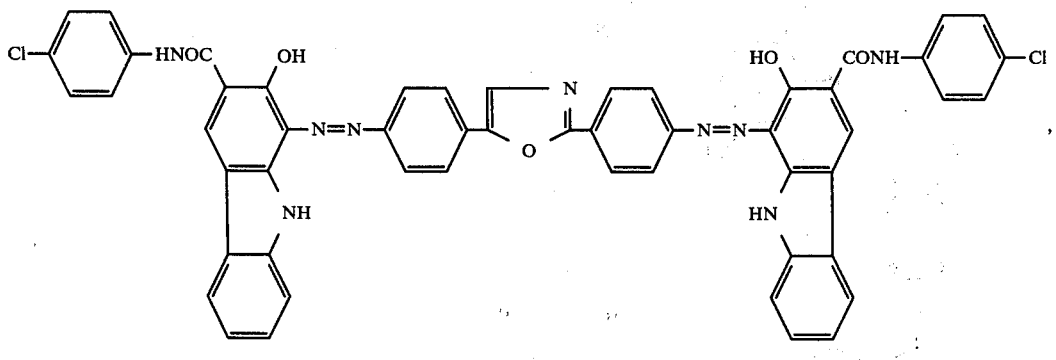

10 g of the polyester resin solution mentioned above (Example 1), and 80 ml of THF was coated on said bond layer to form a charge generation layer of 0.25 g/m² after drying.

Charge bearing characteristics of the photosensitive members prepared in this manner are shown in Table 3.

TABLE 2
Pigments used
Disazo pigment represented by formula [III]
| Example No. | Pigment No. | Cp | $B_1$* | $B_2$* |
|---|---|---|---|---|
| 22 | 20 | 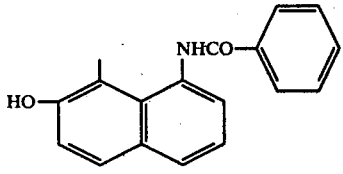 | H | H |
| 23 | 21 | 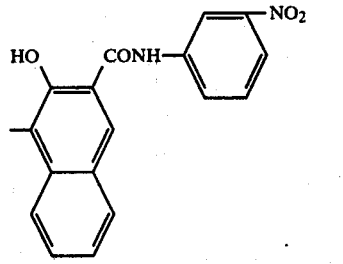 | H | H |
| 24 | 22 | 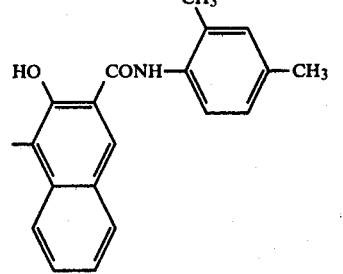 | H | H |
| 25 | 23 | 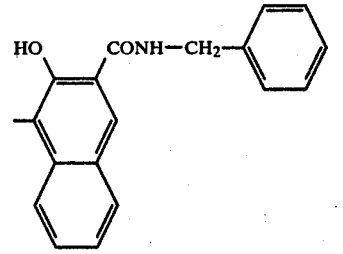 | CH$_3$ (o) | H |
| 26 | 24 | 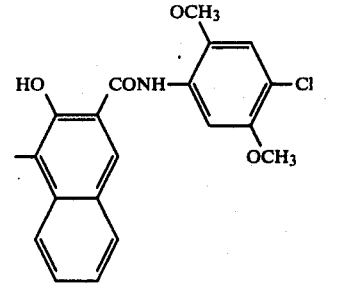 | CH$_3$ (o) | H |
| 27 | 25 | 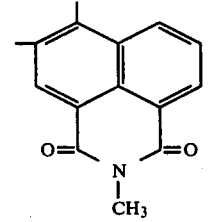 | H | H |

TABLE 2-continued

Pigments used

Disazo pigment represented by formula [III]

| Example No. | Pigment No. | Cp | $B_1$* | $B_2$* |
|---|---|---|---|---|
| 28 | 26 | [3-hydroxy-4-methyl-2-naphthyl N,N-diphenylcarboxamide] | Cl (m) | H |
| 29 | 27 | [6-hydroxy-5-methyl-2-methyl-1H-benz[de]isoquinoline-1,3(2H)-dione] | H | H |
| 30 | 28 | [3-hydroxy-4-methyl-N-(1-naphthyl)-2-naphthamide] | H | H |
| 31 | 29 | [3-hydroxy-4-methyl-N-phenyl-2-naphthamide] | CH$_3$ (o) | H |
| 32 | 30 | [3-hydroxy-4-methyl-N-phenyl-2-naphthamide] | OCH$_3$ (o) | H |

TABLE 2-continued

Pigments used
Disazo pigment represented by formula [III]

| Example No. | Pigment No. | Cp | $B_1$* | $B_2$* |
|---|---|---|---|---|
| 33 | 31 | 3-hydroxy-4-methyl-2-naphthanilide | $OC_2H_5$ (o) | H |
| 34 | 32 | 3-hydroxy-4-methyl-2-naphthanilide | OH (o) | H |
| 35 | 33 | 3-hydroxy-4-methyl-2-naphthanilide | $OCH_3$ (o) | $OCH_3$ (o') |
| 36 | 34 | 3-hydroxy-4-methyl-2-naphthanilide | $NHCOCH_3$ (m) | H |
| 37 | 35 | 3-hydroxy-4-methyl-2-naphth-N-methylamide | H | H |
| 38 | 36 | 3-hydroxy-4-methyl-2-naphth-N-ethylamide | H | H |

TABLE 2-continued

Pigments used
Disazo pigment represented by formula [III]

| Example No. | Pigment No. | Cp | $B_1$* | $B_2$* |
|---|---|---|---|---|
| 39 | 37 | OH, CONH—$C_3H_7(n)$ (naphthalene) | H | H |
| 40 | 38 | OH, CONH—$C_4H_9(n)$ (naphthalene) | H | H |
| 41 | 39 | OH, CONH—$C_6H_{13}(n)$ (naphthalene) | H | H |
| 42 | 40 | OH, CONH—$C_8H_{17}(n)$ (naphthalene) | H | H |
| 43 | 41 | OH, CON($CH_3$)—$CH_3$ (naphthalene) | H | H |
| 44 | 42 | OH, CON($C_2H_5$)—$C_2H_5$ (naphthalene) | H | H |

*The position of $B_1$ and $B_2$ substituent in relation to the azo group is shown in the parentheses.

TABLE 3

| Example No. | Pigment No. | Charge bearing characteristics | | |
|---|---|---|---|---|
| | | Vo (−V) | Vk (%) | E½ (lux · sec) |
| 22 | 20 | 560 | 89 | 12.0 |
| 23 | 21 | 590 | 92 | 13.2 |

TABLE 3-continued

| Example No. | Pigment No. | Vo (−V) | Vk (%) | E ½ (lux·sec) |
|---|---|---|---|---|
| 24 | 22 | 570 | 90 | 11.3 |
| 25 | 23 | 600 | 94 | 15.6 |
| 26 | 24 | 590 | 93 | 14.2 |
| 27 | 25 | 560 | 88 | 8.6 |
| 28 | 26 | 600 | 93 | 15.5 |
| 29 | 27 | 590 | 91 | 9.4 |
| 30 | 28 | 580 | 90 | 13.2 |
| 31 | 29 | 570 | 92 | 8.3 |
| 32 | 30 | 580 | 89 | 8.6 |
| 33 | 31 | 570 | 91 | 8.7 |
| 34 | 32 | 600 | 93 | 9.6 |
| 35 | 33 | 560 | 87 | 8.2 |
| 36 | 34 | 590 | 93 | 10.4 |
| 37 | 35 | 560 | 89 | 6.3 |
| 38 | 36 | 580 | 90 | 6.7 |
| 39 | 37 | 570 | 88 | 7.8 |
| 40 | 38 | 600 | 90 | 8.4 |
| 41 | 39 | 590 | 89 | 9.3 |
| 42 | 40 | 570 | 88 | 12.3 |
| 43 | 41 | 590 | 92 | 8.1 |
| 44 | 42 | 600 | 91 | 8.6 |

EXAMPLE 45

A solution prepared by dissolving 5 g of 2,4,7-trinitro-9-fluorenone and 5 g of the polycarbonate mentioned above in 70 ml of THF was coated on the charge generation layer prepared in Example 31, to form a charge transport layer of 11 g/m² after drying.

Charge bearing characteristics of this photosensitive member were as follows:

Vo: ⊕ 490 V; Vk: 88%; E ½: 18.8 lux.sec

EXAMPLE 46

A dispersion of pigment No.18, used in Example 20, in a solution prepared by dissolving 5 g of 1-(6-methoxy-2-pyridyl)-3-(p-diethylaminostyryl)-5-(p-diethylaminophenyl)pyrazoline and 5 g of the poly(N-vinylcarbazole) mentioned above (Example 19) in 70 ml of THF was coated on the same bond layer as prepared in Example 20, to form a photosensitive layer of 12 g/m² after drying.

Charge bearing characterisics of this photosensitive member were as follows:

Vo: ⊕ 480 V; Vk: 89%; E ½: 17.2 lux.sec

EXAMPLE 47

A dispersion prepared from 5 g of pigment No.43 having the structure

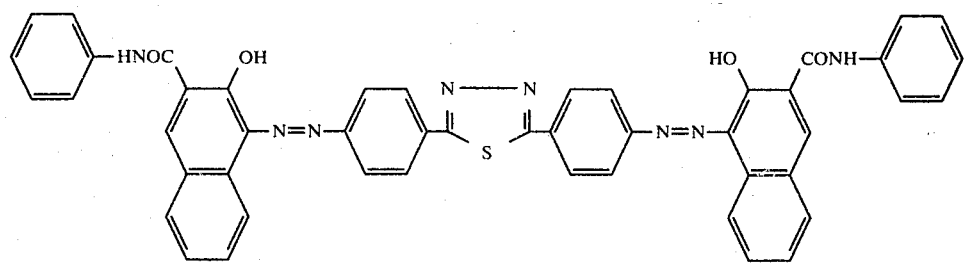

5 g of the polyester resin solution mentioned above (Example 1), and 80 ml of THF was coated on the same bond layer as prepared in Example 20, to form a charge generation layer of 0.15 g/m² after drying.

A solution prepared by dissolving 5 g of 2,5-bis(p-diethylaminophenyl)-1,3,4-oxadiazole and 5 g of a phenoxy resin obtained from reacting bisphenol A with epichlorohydrine (trade name of the resin: Bakelite PKHH, manufd. by Union Carbide Corp.) in 70 ml of THF was coated on said charge generation layer to form a charge transport layer of 11 g/m² after drying.

Charge bearing characteristics of this photosensitive member were as follows:

Vo: ⊖ 580 V; Vk: 93%; E ½: 8.2 lux.sec

EXAMPLE 48

A solution prepared by dissolving 5 g of 2,4,7-trinitro-9-fluorenone and 5 g of the above-mentioned polycarbonate in 70 ml of THF was coated on the same charge generation layer as prepared in Example 47, to form a charge transport layer of 12 g/m² after drying.

Charge bearing characteristics of this photosensitive member were as follows:

Vo: ⊕ 490 V; Vk: 90%; E ½: 17.8 lux.sec

EXAMPLES 49-71

After 5 g of each disazo pigment of formula [IV], of which Cp, B₁, B₂, B₁', and B₂' are shown in Table 4, was dispersed in a solution of 2 g of the above-mentioned poly(vinyl butyral)resin in 95 ml of ethanol, the resulting dispersion was coated on the aluminum surface of a Mylar film vacuum metallized with aluminum, to form a charge generation layer of 0.25 g/m² after drying.

A solution prepared by dissolving 5 g of 1-phenyl-3-(p-diethylaminostyryl)-5-(p-diethylaminophenyl)-pyrazoline and 5 g of the above-mentioned polycarbonate resin in 70 ml of THF was coated on said charge generation layer to form a charge transport layer of 10 g/m² after drying.

Charge bearing characteristics of the photosensitive members prepared in this way were shown in Table 5.

TABLE 4
| Example No. | Pigment No. | Cp | B₁* | B₂* | B'₁* | B'₂* |
|---|---|---|---|---|---|---|
| 49 | 44 | 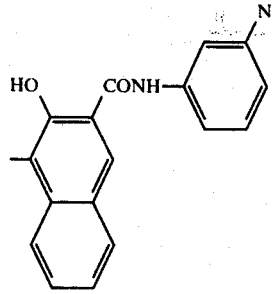 | H | H | H | H |
| 50 | 45 | 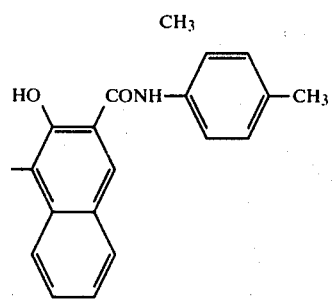 | H | H | H | H |
| 51 | 46 | 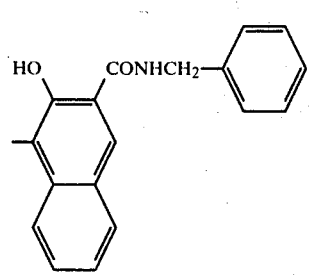 | H | H | H | H |
| 52 | 47 | 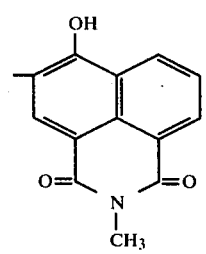 | H | H | H | H |
| 53 | 48 | 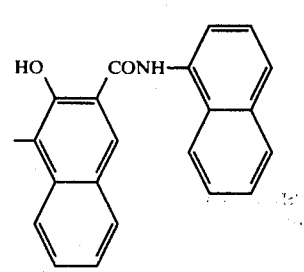 | H | H | H | H |
| 54 | 49 | 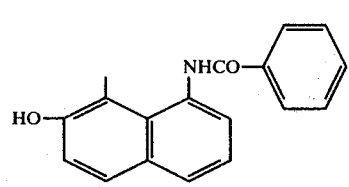 | H | H | H | H |

TABLE 4-continued
| | | Pigments used | | | | |
|---|---|---|---|---|---|---|
| Example No. | Pigment No. | Cp (Disazo pigment represented by formula [IV]) | $B_1^*$ | $B_2^*$ | $B'_1^*$ | $B'_2^*$ |
| 55 | 50 | 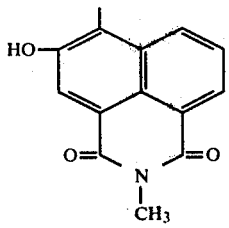 | H | H | H | H |
| 56 | 51 | 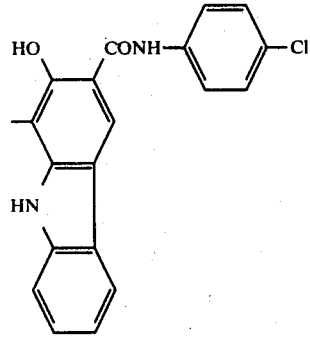 | H | H | H | H |
| 57 | 52 | 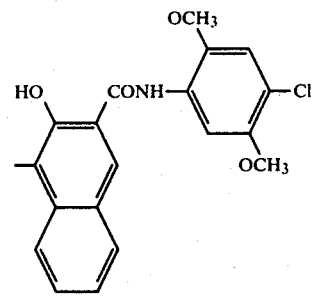 | H | H | H | H |
| 58 | 53 | 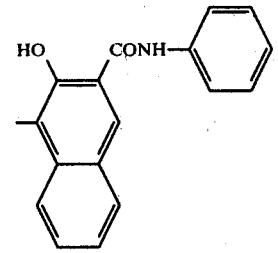 | $OCH_3$ (o) | H | $OCH_3$ (o) | H |
| 59 | 54 | 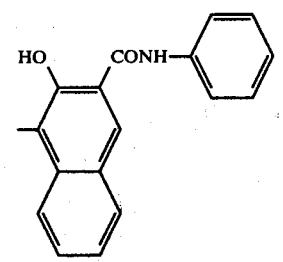 | $CH_3$ (o) | H | $CH_3$ (o) | H |

TABLE 4-continued

| Example No. | Pigment No. | Pigments used Cp | $B_1^*$ | $B_2^*$ | $B'_1{}^*$ | $B'_2{}^*$ |
|---|---|---|---|---|---|---|
| 60 | 55 | ![Cp structure: 3-hydroxy-4-methyl-2-naphthanilide] | Cl (o) | H | Cl (o) | H |
| 61 | 56 | ![Cp structure: 3-hydroxy-4-methyl-2-naphthanilide] | OCH$_3$ (o) | OCH$_3$ (o') | OCH$_3$ (o) | OCH$_3$ (o') |
| 62 | 57 | ![Cp structure: 3-hydroxy-4-methyl-2-naphthanilide] | H | H | CH$_3$ (o) | H |
| 63 | 58 | ![Cp structure: 3-hydroxy-4-methyl-2-naphthanilide] | OC$_2$H$_5$ (o) | H | OC$_2$H$_5$ (o) | H |
| 64 | 59 | ![Cp structure: 3-hydroxy-4-methyl-N-methyl-2-naphthamide] | H | H | H | H |
| 65 | 60 | ![Cp structure: 3-hydroxy-4-methyl-N-ethyl-2-naphthamide] | H | H | H | H |

TABLE 4-continued

| Example No. | Pigment No. | Cp | $B_1$* | $B_2$* | $B'_1$* | $B'_2$* |
|---|---|---|---|---|---|---|
| 66 | 61 | 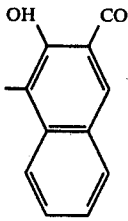 3-OH, 2-CONH—$C_3H_7$(n), 4-methyl naphthalene | H | H | H | H |
| 67 | 62 | 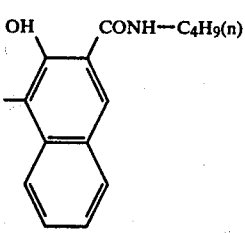 3-OH, 2-CONH—$C_4H_9$(n), 4-methyl naphthalene | H | H | H | H |
| 68 | 63 | 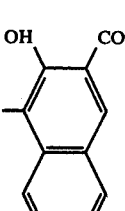 3-OH, 2-CONH—$C_6H_{13}$(n), 4-methyl naphthalene | H | H | H | H |
| 69 | 64 | 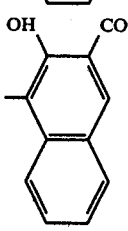 3-OH, 2-CONH—$C_8H_{17}$(n), 4-methyl naphthalene | H | H | H | H |
| 70 | 65 | 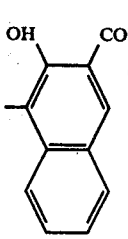 3-OH, 2-CON($CH_3$)$_2$, 4-methyl naphthalene | H | H | H | H |
| 71 | 66 | 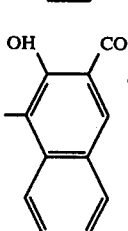 3-OH, 2-CON($C_2H_5$)$_2$, 4-methyl naphthalene | H | H | H | H |

*The position of $B_1$, $B_2$, $B'_1$, or $B'_2$ substituent in relation to the azo group is shown in parentheses.

TABLE 5

| Example No. | Pigment No. | Vo (−V) | Vk (%) | E½ (lux · sec) |
|---|---|---|---|---|
| 49 | 44 | 560 | 89 | 12.6 |
| 50 | 45 | 580 | 92 | 9.8 |
| 51 | 46 | 610 | 94 | 16.5 |
| 52 | 47 | 570 | 90 | 8.6 |
| 53 | 48 | 590 | 92 | 11.0 |
| 54 | 49 | 580 | 90 | 10.8 |

Charge bearing characteristics

TABLE 5-continued

| Example No. | Pigment No. | Vo (−V) | Vk (%) | E ½ (lux · sec) |
|---|---|---|---|---|
| 55 | 50 | 600 | 93 | 9.0 |
| 56 | 51 | 570 | 89 | 9.2 |
| 57 | 52 | 590 | 91 | 11.9 |
| 58 | 53 | 560 | 89 | 8.6 |
| 59 | 54 | 590 | 92 | 8.4 |
| 60 | 55 | 600 | 93 | 9.6 |
| 61 | 56 | 580 | 90 | 9.2 |
| 62 | 57 | 560 | 88 | 10.1 |
| 63 | 58 | 590 | 91 | 8.8 |
| 64 | 59 | 570 | 92 | 7.8 |
| 65 | 60 | 590 | 91 | 8.0 |
| 66 | 61 | 600 | 91 | 8.4 |
| 67 | 62 | 580 | 89 | 9.3 |
| 68 | 63 | 570 | 89 | 10.0 |
| 69 | 64 | 560 | 88 | 11.2 |
| 70 | 65 | 590 | 91 | 8.3 |
| 71 | 66 | 600 | 92 | 8.5 |

EXAMPLE 72

After 1.0 g of pigment No.43, used in Example 47, was dispersed in a solution prepared by dissolving 5 g of p-diethylaminobenzaldehyde-N,N-diphenylhydrazone and 5 g of the above-mentioned poly(N-vinylcarbazole) in 70 ml of THF, the resulting dispersion was coated on the same bond layer as prepared in Example 1, to form a photosensitive layer of 10 g/m² after drying.

Charge bearing characteristics of this photosensitive member were as follows:

Vo: ⊕ 470 V; Vk: 87%; E ½: 18.8 lux.sec

EXAMPLE 73

An aqueous solution of poly(vinyl alcohol) was coated on an aluminum plate of 100μ in thickness to form a bond layer of 0.8 g/m² after drying.

A dispersion prepared from 5 g of pigment No.67 having the structure

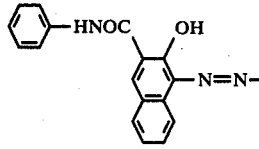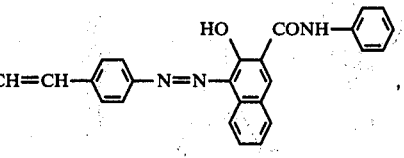

10 g of the above-mentioned polyester resin solution, and 80 ml of THF was coated on said bond layer to form a charge generation layer of 0.20 g/m² after drying.

A solution prepared by dissolving 5 g of 2,5-bis(p-diethylaminophenyl)-1,3,4-oxadiazole and 5 g of the above-mentioned poly(methyl methacrylate)resin in 70 ml of THF was coated on said charge generation layer to form a charge transport layer of 10 g/m² after drying.

Charge bearing characteristics of this photosensitive member were as follows:

Vo: ⊖ 590 V; Vk: 93%; E ½: 8.5 lux.sec

EXAMPLE 74

A solution prepared by dissolving 5 g of 2,4,7-trinitro-9-fluorenone and 5 g of the above-mentioned polycarbonate resin in 70 ml of THF was coated on the charge generation layer prepared in Example 73, to form a charge transport layer of 12 g/m² after drying.

Charge bearing characteristics of this photosensitive member were as follows:

Vo: ⊕ 520 V; Vk: 88%; E ½: 16.7 lux.sec

EXAMPLES 75-94

After 5 g of each disazo pigment of formula [V], of which Cp is shown in Table 6, was dispersed in a solution of 2 g of the above-mentioned poly(vinyl butyral)resin in 95 ml of ethanol, the resulting dispersion was coated on the aluminum surface of a Mylar film vacuum metallized with aluminum, to form a charge generation layer of 0.2 g/m² after drying.

A solution prepared by dissolving 5 g of 1-phenyl-3-(p-diethylaminostyryl)-5-(p-diethylaminophenyl)-pyrazoline and 5 g of the above-mentioned polycarbonate resin in 70 ml of THF was coated on the above-mentioned charge generation layer to form a charge transport layer of 11 g/m² after drying.

Charge bearing characteristics of the photosensitive members prepared in this way are shown in Table 6.

TABLE 6

| | | Pigments used and charge bearing characteristics | | | |
|---|---|---|---|---|---|
| | | Disazo pigment represented by formula [V] | Charge bearing characteristics | | |
| Example No. | Pigment No. | Cp | Vo (−V) | Vk (%) | E ½ (lux · sec) |
| 75 | 68 | 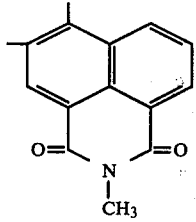 | 580 | 91 | 8.2 |

TABLE 6-continued
Pigments used and charge bearing characteristics
| Example No. | Pigment No. | Disazo pigment represented by formula [V] Cp | Vo (−V) | Vk (%) | E½ (lux · sec) |
|---|---|---|---|---|---|
| 76 | 69 | 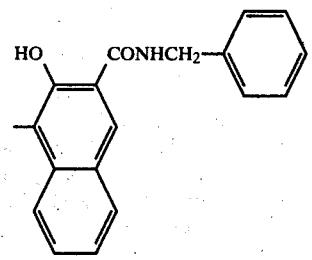 | 600 | 94 | 16.5 |
| 77 | 70 | 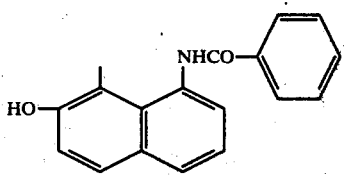 | 560 | 88 | 8.9 |
| 78 | 71 | 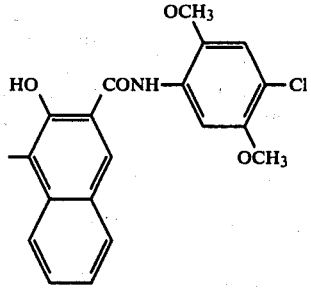 | 570 | 90 | 9.8 |
| 79 | 72 | 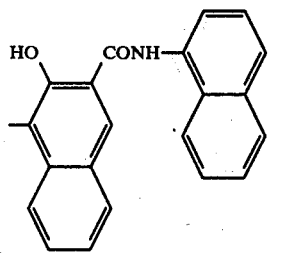 | 570 | 93 | 10.0 |
| 80 | 73 | 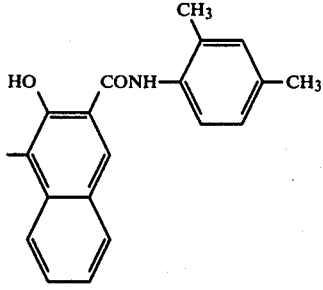 | 590 | 90 | 9.4 |

TABLE 6-continued
Pigments used and charge bearing characteristics
| Example No. | Pigment No. | Disazo pigment represented by formula [V] Cp | Charge bearing characteristics | | |
|---|---|---|---|---|---|
| | | | Vo (−V) | Vk (%) | E½ (lux·sec) |
| 81 | 74 | 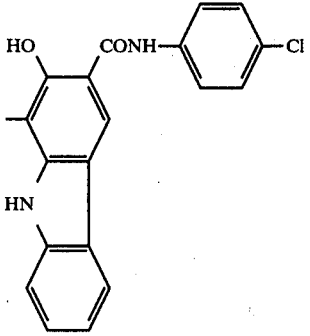 | 560 | 89 | 8.9 |
| 82 | 75 | 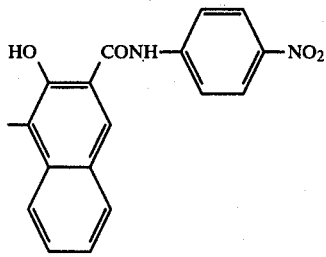 | 600 | 94 | 14.3 |
| 83 | 76 | 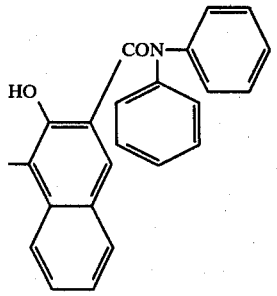 | 580 | 92 | 15.2 |
| 84 | 77 | 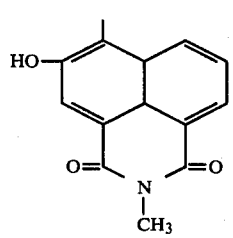 | 550 | 90 | 8.9 |

TABLE 6-continued

Pigments used and charge bearing characteristics

| Example No. | Pigment No. | Disazo pigment represented by formula [V] Cp | Vo (−V) | Vk (%) | E½ (lux·sec) |
|---|---|---|---|---|---|
| 85 | 78 | (structure: HO, CONH-(2-OCH₃, 5-OCH₃ phenyl), with dibenzofuran-type fused ring) | 580 | 91 | 9.8 |
| 86 | 79 | HO, CONH—⟨C₆H₄⟩—Br on naphthalene | 590 | 93 | 9.6 |
| 87 | 80 | OH, CONH—CH₃ on naphthalene | 590 | 94 | 7.8 |
| 88 | 81 | OH, CONH—C₂H₅ on naphthalene | 580 | 92 | 8.0 |
| 89 | 82 | OH, CONH—C₃H₇(n) on naphthalene | 590 | 90 | 8.0 |

TABLE 6-continued

Pigments used and charge bearing characteristics

| Example No. | Pigment No. | Disazo pigment represented by formula [V] Cp | Vo (−V) | Vk (%) | E ½ (lux · sec) |
|---|---|---|---|---|---|
| 90 | 83 | OH, CONH—$C_4H_9$(n) on naphthalene | 570 | 91 | 9.3 |
| 91 | 84 | OH, CONH—$C_6H_{13}$(n) on naphthalene | 560 | 90 | 9.6 |
| 92 | 85 | OH, CONH—$C_8H_{17}$(n) on naphthalene | 560 | 88 | 10.8 |
| 93 | 86 | OH, CON(—$CH_3$)$CH_3$ on naphthalene | 570 | 92 | 8.1 |
| 94 | 87 | OH, CON(—$C_2H_5$)$C_2H_5$ on naphthalene | 580 | 89 | 8.9 |

EXAMPLE 95

A solution of casein in aqueous ammonia was coated on an aluminum plate of 100μ in thickness to form a bond layer of 1.08 g/m² after drying.

After 1.0 g of pigment No.74, used in Example 81, was dispersed in a solution prepared by dissolving 5 g of p-diethylaminobenzaldehyde-N,N-diphenylhydrazone and 5 g of the above-mentioned poly(N-vinylcarbazole) in 70 ml of THF, the resulting dispersion was coated on said bond layer to form a photosensitive layer of 12 g/m² after drying.

Charge bearing characteristics of this photosensitive member were as follows:

Vo: ⊕ 520 V; Vk: 89%; E ½: 14.8 lux.sec

EXAMPLE 96

A solution of casein in aqueous ammonia was coated on an aluminum plate of 100μ in thickness to form a bond layer of 0.8 g/m² after drying.

A dispersion prepared from 5 g of pigment No.88 having the structure

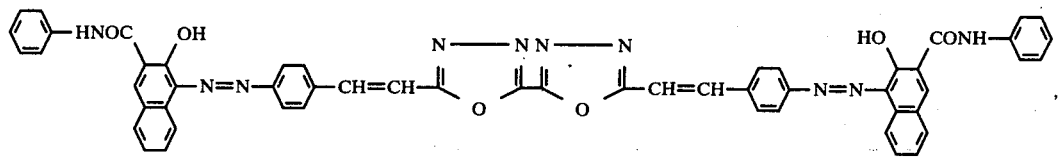

10 g of the above-mentioned polyester resin solution, and 80 ml of THF was coated on said bond layer to form a charge generation layer of 0.15 g/m² after drying.

A solution prepared by dissolving 5 g of 2,5-bis(p-diethylaminophenyl)-1,3,4-oxadiazole and 5 g of the above-mentioned poly(methyl methacrylate)resin in 70 ml of THF was coated on said charge generation layer to form a charge transport layer of 10 g/m² after drying.

Charge bearing characteristics of this photosensitive member were as follows:

Vo: ⊖ 560 V; Vk: 91%; E ½: 8.9 lux.sec

EXAMPLES 97–117

After 5 g of each disazo pigment of formula [IV], of which Cp and D₁ are shown in Table 7, was dispersed in a solution of 2 g of the above-mentioned poly(vinyl butyral)resin in 95 ml of ethanol, the resulting dispersion was coated on the aluminum surface of a Mylar film vacuum metallized with aluminum, to form a charge generation layer of 0.2 g/m² after drying.

A solution prepared by dissolving 5 g of 1-phenyl-3-(p-diethylaminostyryl)-5-(p-diethylaminophenyl)-pyrazoline and 5 g of the above-mentioned polycarbonate resin in 70 ml of THF was coated on said charge generation layer to form a charge transport layer of 10 g/m² after drying.

Charge bearing characteristics of the photosensitive members prepared in this way are shown in Table 8.

TABLE 7

| | | Pigments used | |
|---|---|---|---|
| Example No. | Pigment No. | Disazo pigment represented by formula [VI] | |
| | | Cp | D₁ |
| 97 | 89 | [structure] | (single bond) |
| 98 | 90 | [structure] | — |
| 99 | 91 | [structure] | — |

TABLE 7-continued

| Example No. | Pigment No. | Pigments used Disazo pigment represented by formula [VI] | |
|---|---|---|---|
| | | Cp | D₁ |
| 100 | 92 | 3-hydroxy-4-methyl-N-(2-methoxy-4-chloro-5-methoxyphenyl)-2-naphthamide | — |
| 101 | 93 | 3-hydroxy-4-methyl-N-(2,4-dimethylphenyl)-2-naphthamide | — |
| 102 | 94 | 3-hydroxy-N-(1-naphthyl)-2-naphthamide | —CH=CH— |
| 103 | 95 | 6-hydroxy-5-methyl-N-methyl-naphthalimide | —CH=CH— |
| 104 | 96 | 3-hydroxy-4-methyl-N-benzyl-2-naphthamide | —CH=CH— |
| 105 | 97 | 2-hydroxy-1-methyl-8-(phenylcarbonylamino)naphthalene | —CH=CH— |

TABLE 7-continued

| | | Pigments used | |
|---|---|---|---|
| Example No. | Pigment No. | Disazo pigment represented by formula [VI] Cp | $D_1$ |
| 106 | 98 | 3-hydroxy-N-phenyl-2-naphthamide (with methyl at 4-position) | —CH=CH— |
| 107 | 99 | 3-hydroxy-N-phenyl-2-naphthamide (with methyl at 4-position) | p-phenylene |
| 108 | 100 | 3-hydroxy-N-methyl-2-naphthamide (with methyl at 4-position) | — |
| 109 | 101 | 3-hydroxy-N-ethyl-2-naphthamide (with methyl at 4-position) | — |
| 110 | 102 | 3-hydroxy-N-n-propyl-2-naphthamide (with methyl at 4-position) | — |
| 111 | 103 | 3-hydroxy-N-n-butyl-2-naphthamide (with methyl at 4-position) | — |

TABLE 7-continued

| Example No. | Pigment No. | Pigments used — Disazo pigment represented by formula [VI] Cp | $D_1$ |
|---|---|---|---|
| 112 | 104 | OH, CONH—$C_6H_{13}$(n) (hydroxynaphthalene carboxamide) | — |
| 113 | 105 | OH, CONH—$C_8H_{17}$(n) (hydroxynaphthalene carboxamide) | — |
| 114 | 106 | OH, CON(—$CH_3$)$CH_3$ (hydroxynaphthalene carboxamide) | — |
| 115 | 107 | OH, CON(—$C_2H_5$)$C_2H_5$ (hydroxynaphthalene carboxamide) | — |
| 116 | 108 | OH, CONH—$CH_3$ (hydroxynaphthalene carboxamide) | —CH=CH— |
| 117 | 109 | OH, CONH—$C_2H_5$ (hydroxynaphthalene carboxamide) | —CH=CH— |

TABLE 8

| | | Charge bearing characteristics | | |
|---|---|---|---|---|
| Example No. | Pigment No. | Vo (−V) | Vk (%) | E ½ (lux · sec) |
| 97 | 89 | 580 | 93 | 9.4 |
| 98 | 90 | 560 | 91 | 9.9 |
| 99 | 91 | 570 | 90 | 14.2 |
| 100 | 92 | 590 | 94 | 14.2 |

TABLE 8-continued

| Example No. | Pigment No. | Vo (−V) | Vk (%) | E ½ (lux · sec) |
|---|---|---|---|---|
| 101 | 93 | 600 | 93 | 9.8 |
| 102 | 94 | 590 | 89 | 13.9 |
| 103 | 95 | 590 | 92 | 9.5 |
| 104 | 96 | 610 | 94 | 16.3 |
| 105 | 97 | 580 | 90 | 13.8 |
| 106 | 98 | 570 | 91 | 9.2 |
| 107 | 99 | 580 | 92 | 9.0 |
| 108 | 100 | 560 | 88 | 8.3 |
| 109 | 101 | 570 | 89 | 8.6 |
| 110 | 102 | 590 | 91 | 9.0 |
| 111 | 103 | 590 | 92 | 9.0 |
| 112 | 104 | 580 | 87 | 9.3 |
| 113 | 105 | 570 | 88 | 11.2 |
| 114 | 106 | 600 | 91 | 8.6 |
| 115 | 107 | 580 | 92 | 8.6 |
| 116 | 108 | 590 | 89 | 8.4 |
| 117 | 109 | 580 | 88 | 8.6 |

EXAMPLE 118

A solution prepared by dissolving 5 g of 2,4,7-trinitro-9-fluorenone and 5 g of the above-mentioned polycarbonate resin in 70 ml of THF was coated on the charge generation layer prepared in Example 97, to form a charge transport layer of 11 g/m² after drying.

Charge bearing characteristics of this photosensitive member were as follows:
Vo: ⊕ 510 V; Vk: 88%; E ½: 19.2 lux.sec

EXAMPLE 119

An aqueous solution of poly(vinyl alcohol) was coated on an aluminum plate of 100μ in thickness to form a bond layer of 1.2 g/m² after drying.

After 1.0 g of pigment No.98, used in Example 106, was dispersed in a solution prepared by dissolving 5 g of 2-(p-diethylaminophenyl)-4-(p-dimethylaminophenyl)-5-(2-chlorophenyl)oxazole and 5 g of the above-mentioned poly(N-vinylcarbazole) in 150 ml of dichloromethane, the resulting dispersion was coated on said bond layer to form a photosensitive layer of 11 g/m² after drying.

Charge bearing characteristics of this photosensitive member were as follows:
Vo: ⊕ 500 V; Vk: 91%; E ½: 18 lux.sec

EXAMPLE 120

A solution of casein in aqueous ammonia was coated on an aluminum plate of 100μ in thickness to form a bond layer of 1.5 g/m² after drying.

A dispersion prepared from 5 g of pigment No.110 having the structure

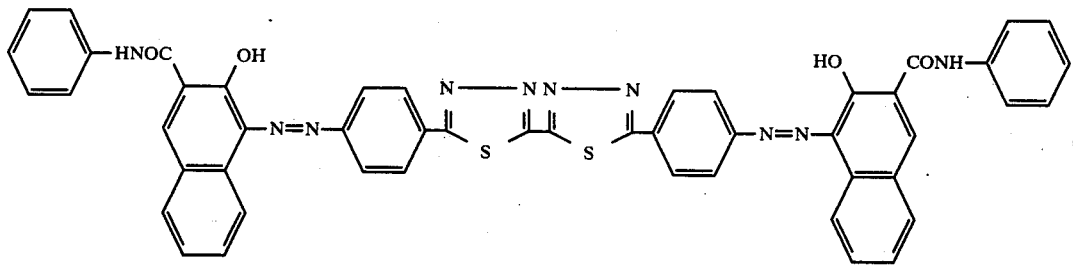

10 g of the above-mentioned polyester resin solution, and 80 ml of THF was coated on said bond layer to form a charge generation layer of 0.20 g/m² after drying.

A solution prepared by dissolving 5 g of 1-phenyl-3-(p-diethylaminophenyl)-5-(p-diethylaminophenyl)-pyrazoline and 5 g of the phenoxy resin mentioned above (Example 47) in 70 ml of the THF was coated on said charge generation layer to form a charge transport layer of 10 g/m² after drying.

Charge bearing characteristics of this photosensitive member were as follows:
Vo: ⊖600 V; Vk 91%; E ½ 9.5 lux.sec

EXAMPLES 121-145

An aqueous solution of poly(vinyl alcohol) was coated on the aluminum surface of a Mylar film vacuum metallized with aluminum, to form a bond layer of 1.0 g/m² after drying.

After 5 g of each disazo pigment represented by formula [VII], of which Cp, D₂, B₁, B₂, B₁', and B₂' are shown in Table 9 was dispersed in a solution of 2 g of the above-mentioned poly(vinyl butyral)resin in 95 ml of ethanol, the resulting dispersion was coated on said bond layer to form a charge generation layer of 0.25 g/m² after drying.

A solution prepared by dissolving 5 g of 2,5-bis(p-diethylaminophenyl)-1,3,4-oxadiazole and 5 g of the above-mentioned polycarbonate resin in 70 ml of THF was coated on said charge generation layer to form a charge transport layer of 11 g/m² after drying.

Charge bearing characteristics of the photosensitive members prepared in this way are shown in Table 10.

TABLE 9

| Example No. | Pigment No. | Cp | B₁* | B₂* | B'₁* | B'₂* | D₂ |
|---|---|---|---|---|---|---|---|
| 121 | 111 | 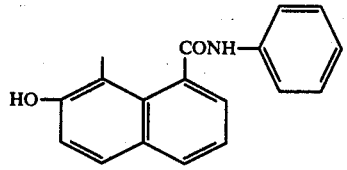 | H | H | H | H | (single bond) |

TABLE 9-continued

| | | Pigments used | | | | | |
|---|---|---|---|---|---|---|---|
| | | | Disazo pigment represented by formula [VII] | | | | |
| Example No. | Pigment No. | Cp | $B_1^*$ | $B_2^*$ | $B'_1^*$ | $B'_2^*$ | $D_2$ |
| 122 | 112 | [structure: 3-hydroxy-N-phenyl naphthamide with HN-phenyl substituent] | H | H | H | H | — |
| 123 | 113 | [structure: 3-hydroxy-N-(3-nitrophenyl)-4-methyl-2-naphthamide] | $CH_3$ (o) | H | $CH_3$ (o) | H | — |
| 124 | 114 | [structure: 3-hydroxy-N-(2,5-dimethoxy-4-chlorophenyl)-4-methyl-2-naphthamide] | $OC_2H_5$ (o) | H | $OC_2H_5$ (o) | H | — |
| 125 | 115 | [structure: 3-hydroxy-N-benzyl-4-methyl-2-naphthamide] | Cl (m) | H | Cl (m) | H | — |
| 126 | 116 | [structure: 3-hydroxy-N-(2,4-dimethylphenyl)-4-methyl-2-naphthamide] | H | H | H | H | —CH=CH— |

TABLE 9-continued

| | | Pigments used | | | | | |
|---|---|---|---|---|---|---|---|
| | | | Disazo pigment represented by formula [VII] | | | | |
| Example No. | Pigment No. | Cp | $B_1^*$ | $B_2^*$ | $B'_1^*$ | $B'_2^*$ | $D_2$ |
| 127 | 117 | 3-hydroxy-N-(1-naphthyl)-2-naphthamide | H | H | H | H | —CH=CH— |
| 128 | 118 | 3-hydroxy-N,N-diphenyl-2-naphthamide | H | H | H | H | —CH=CH— |
| 129 | 119 | 6-hydroxy-2-methyl-1H-benz[de]isoquinoline-1,3(2H)-dione derivative | H | H | H | H | —CH=CH— |
| 130 | 120 | 3-hydroxy-N-phenyl-2-naphthamide | OCH$_3$ (o) | OCH$_3$ (o') | OCH$_3$ (o) | OCH$_3$ (o') | —CH=CH— |
| 131 | 121 | 3-hydroxy-N-phenyl-2-naphthamide | H | H | H | H | —CH=CH— |

TABLE 9-continued

Pigments used

Disazo pigment represented by formula [VII]

| Example No. | Pigment No. | Cp | $B_1^*$ | $B_2^*$ | $B'_1^*$ | $B'_2^*$ | $D_2$ |
|---|---|---|---|---|---|---|---|
| 132 | 122 | 4-methyl-3-hydroxy-naphthalene-1,8-dicarboximide (N-CH₃) | H | H | H | H | — |
| 133 | 123 | 3-hydroxy-4-methyl-2-naphthanilide | H | H | H | H | p-phenylene |
| 134 | 124 | 3-hydroxy-4-methyl-2-naphtho-N-methylamide | H | H | H | H | — |
| 135 | 125 | 3-hydroxy-4-methyl-2-naphtho-N-ethylamide | H | H | H | H | — |
| 136 | 126 | 3-hydroxy-4-methyl-2-naphtho-N-(n-propyl)amide | H | H | H | H | — |
| 137 | 127 | 3-hydroxy-4-methyl-2-naphtho-N-(n-butyl)amide | H | H | H | H | — |

TABLE 9-continued

Pigments used

| Example No. | Pigment No. | Cp | Disazo pigment represented by formula [VII] | | | | |
|---|---|---|---|---|---|---|---|
| | | | $B_1$* | $B_2$* | $B'_1$† | $B'_2$* | $D_2$ |
| 138 | 128 | OH, CONH—C$_6$H$_{13}$(n) (naphthalene) | H | H | H | H | — |
| 139 | 129 | OH, CONH—C$_8$H$_{17}$(n) (naphthalene) | H | H | H | H | — |
| 140 | 130 | OH, CON—CH$_3$, CH$_3$ (naphthalene) | H | H | H | H | — |
| 141 | 131 | OH, CON—C$_2$H$_5$, C$_2$H$_5$ (naphthalene) | H | H | H | H | — |
| 142 | 132 | OH, CONH—CH$_3$ (naphthalene) | H | H | H | H | —CH=CH— |
| 143 | 133 | OH, CONH—CH$_3$ (naphthalene) | CH$_3$ (o) | H | CH$_3$ (o) | H | — |

TABLE 9-continued

| Example No. | Pigment No. | Cp | Disazo pigment represented by formula [VII] | | | | |
|---|---|---|---|---|---|---|---|
| | | | $B_1$* | $B_2$* | $B'_1$* | $B'_2$* | $D_2$ |
| 144 | 134 | OH, CONH—C$_2$H$_5$ (naphthalene) | CH$_3$ (o) | H | CH$_3$ (o) | H | — |
| 145 | 135 | OH, CON—CH$_3$, CH$_3$ (naphthalene) | H | H | H | H | —CH=CH— |

*The position of $B_1$, $B_2$, $B'_1$, or $B'_2$ substituent in relation to the azo group is shown in parentheses.

TABLE 10

| Example No. | Pigment No. | Charge bearing characteristics | | |
|---|---|---|---|---|
| | | Vo (−V) | Vk (%) | E ½ (lux·sec) |
| 121 | 111 | 580 | 90 | 10.5 |
| 122 | 112 | 590 | 88 | 9.6 |
| 123 | 113 | 560 | 87 | 13.2 |
| 124 | 114 | 590 | 93 | 14.1 |
| 125 | 115 | 600 | 94 | 16.9 |
| 126 | 116 | 570 | 90 | 10.4 |
| 127 | 117 | 580 | 91 | 12.1 |
| 128 | 118 | 600 | 94 | 16.0 |
| 129 | 119 | 560 | 88 | 9.0 |
| 130 | 120 | 580 | 90 | 8.9 |
| 131 | 121 | 590 | 91 | 9.6 |
| 132 | 122 | 560 | 90 | 10.0 |
| 133 | 123 | 570 | 92 | 10.4 |
| 134 | 124 | 560 | 88 | 7.9 |
| 135 | 125 | 580 | 90 | 8.3 |
| 136 | 126 | 590 | 93 | 8.6 |
| 137 | 127 | 570 | 90 | 9.6 |
| 138 | 128 | 580 | 91 | 9.5 |
| 139 | 129 | 600 | 89 | 11.4 |
| 140 | 130 | 580 | 90 | 8.6 |
| 141 | 131 | 570 | 87 | 8.9 |
| 142 | 132 | 600 | 89 | 8.4 |
| 143 | 133 | 610 | 91 | 8.2 |
| 144 | 134 | 580 | 90 | 8.9 |
| 145 | 135 | 590 | 92 | 8.6 |

EXAMPLE 146

A solution prepared by dissolving 5 g of 2,4,7-trinitro-9-fluorenone and 5 g of the above-mentioned polycarbonate resin in 70 ml of THF was coated on the charge generation layer prepared in Example 121, to form a charge transport layer of 12 g/m² after drying.

Charge bearing characteristics of this photosensitive member were as follows:

Vo: ⊕530 V; Vk: 86%; E ½: 18.2 lux.sec

EXAMPLE 147

After 1.0 g of pigment No.112, used in Example 122, was dispersed in a solution prepared by dissolving 5 g of p-pyrrolidinobenzaldehyde-N,N-diphenylhydrazone and 5 g of the above-mentioned poly(N-vinylcarbazole) in 70 ml of THF, the resulting dispersion was coated on the bond layer as used in Example 120, to form a photosensitive layer of 12 g/m² after drying.

Charge bearing characteristics of this photosensitive member were as follows:

Vo: ⊕510 V; Vk: 90%; E ½: 17.8 lux.sec

What we claim is:

1. An electrophotographic photosensitive member characterized by having a conductive support, a charge transport layer and a charge generation layer which contains at least one disazo pigment of the formula:

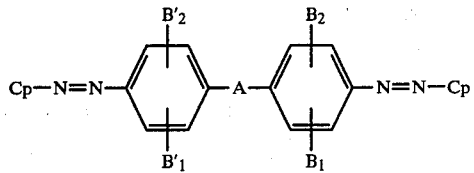

[I]

wherein Cp is a coupler residue; $B_1$, $B_2$, $B'_1$, and $B'_2$ are each selected from the group consisting of hydrogen, halogen, lower alkyl, lower alkoxy, acylamino, and hydroxyl; and A is

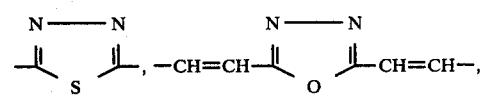

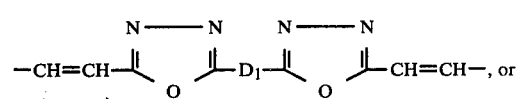

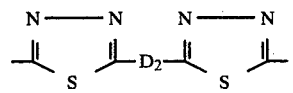

wherein $D_1$ and $D_2$ each is a single bond between two

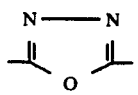

or between two

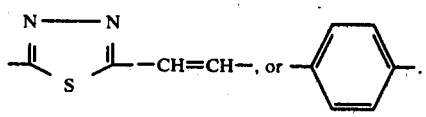

2. An electrophotographic photosensitive member according to claim 1, wherein Cp in formula is a coupler residue of the following formula (A), (B), (C), or (D):

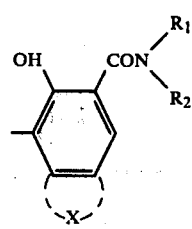 Formula (A)

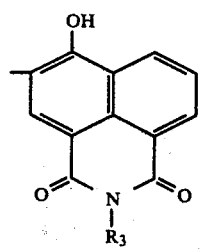 Formula (B)

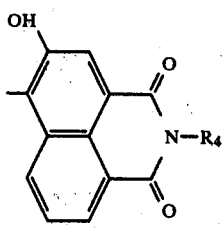 Formula (C)

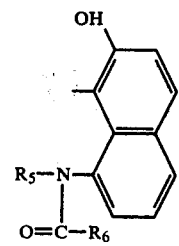 Formula (D)

wherein

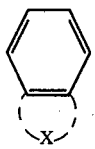

is a naphthalene ring, an anthracene ring, a carbazole ring or a dibenzofuran ring; $R_1$ is hydrogen, substituted or unsubstituted alkyl, or substituted or unsubstituted aryl; and $R_2$, $R_3$, and $R_4$ are substituted or unsubstituted alkyl, substituted or unsubstituted aralkyl, or substituted or unsubstituted aryl; $R_5$ is hydrogen, substituted or unsubstituted alkyl, substituted or unsubstituted aralkyl, or substituted or unsubstituted aryl; and $R_6$ is substituted or unsubstituted aryl.

3. An electrophotographic photosensitive member according to claim 2, wherein $R_1$ in formula (A) is hydrogen.

4. An electrophotographic photosensitive member according to claim 2, wherein the coupler residue represented by formula (D) is

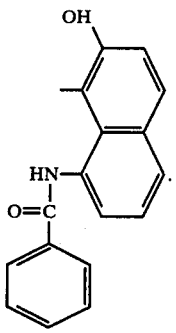

5. An electrophotographic photosensitive member according to claim 1, wherein said disazo pigment is represented by the formula

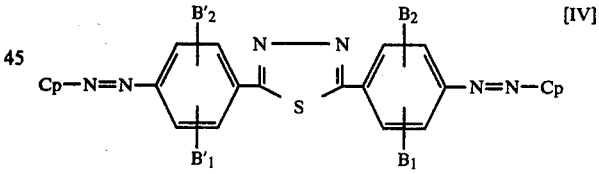 [IV]

wherein Cp is a coupler residue, and $B_1$, $B_2$, $B_1'$, and $B_2'$ are the same or different and each is at least one atom or group selected from the group consisting of hydrogen, halogen, lower alkyl, lower alkoxy, acylamino, and hydroxyl.

6. An electrophotographic photosensitive member according to claim 1, wherein said disazo pigment is represented by the formula

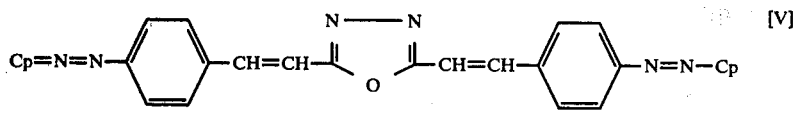 [V]

wherein Cp is a coupler residue.

7. An electrophotographic photosensitive member according to claim 1, wherein said disazo pigment is represented by the formula

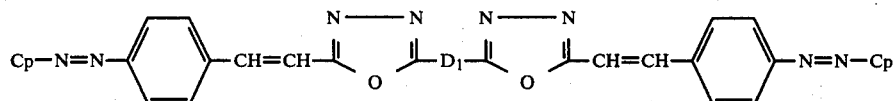

wherein Cp is a coupler residue, and $D_1$ is a single bond between two

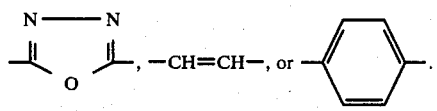

8. An electrophotographic photosensitive member according to claim 1, wherein said disazo pigment is represented by the formula

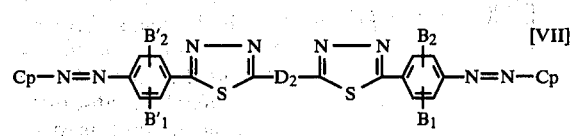

wherein Cp is a coupler residue; $B_1$, $B_2$, $B_1'$, and $B_2'$ are the same or different and each is at least one atom or group selected from the group consisting of hydrogen, halogen, lower alkyl, lower alkoxy, acylamino, and hydroxyl; and $D_2$ is a single bond between two

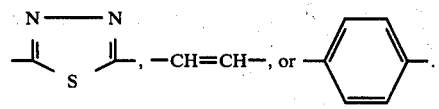

9. An electrophotographic photosensitive member according to claim 1, which has a charge transport layer formed on said charge generation layer.

10. An electrophotographic photosensitive member according to claim 9, which has a laminated structure constituted of a conductive support, a bond layer, said charge generation layer, and a charge transport layer, the layers being laminated in the above-mentioned order.

11. An electrophotographic photosensitive member according to claim 1, wherein said charge generation layer contains a binder.

12. An electrophotographic photosensitive member according to claim 11, wherein said charge generation layer contains up to 80% by weight of the binder.

13. An electrophotographic photosensitive member according to claim 12, wherein said charge generation layer contains up to 40% by weight of the binder.

14. An electrophotographic photosensitive member according to claim 11, wherein said binder is poly(vinyl butyral) or polyester resins.

15. An electrophotographic photosensitive member according to claim 1, wherein said charge transport layer contains a hole-transporting material.

16. An electrophotographic photosensitive member according to claim 15, wherein said hole-transporting material is a compound selected from the group consisting of hydrazones, pyrazolines, oxadiazoles, oxazoles, thiazoles, triarylmethanes, and carbazoles.

17. An electrophotographic photosensitive member according to claim 16, wherein the charge transport layer contains at least one of pyrazoline compounds.

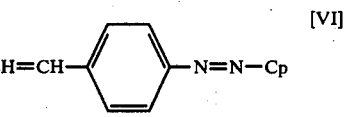

18. An electrophotographic photosensitive member according to claim 16, wherein the charge transport layer contains at least one of hydrazone compounds.

19. An electrophotographic photosensitive member according to claim 1, wherein said charge transport layer contains an electron-transporting material.

20. An electrophotographic photosensitive member according to claim 19, wherein said electron-transporting material is fluorenones.

21. An electrophotographic photosensitive member characterized by having a photosensitive layer containing a binder, a hole-transporting material and at least one disazo pigment of the formula;

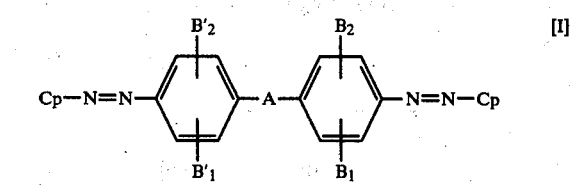

wherein Cp is a coupler residue; $B_1$, $B_2$, $B'_1$, and $B'_2$ are each selected from the group consisting of hydrogen, halogen, lower alkyl, lower alkoxy, acylamino, and hydroxyl; and A is

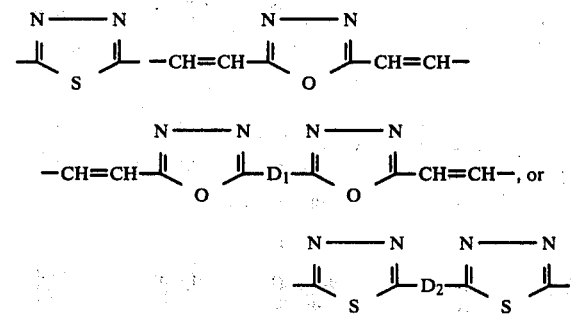

wherein $D_1$ and $D_2$ each is a single bond between two

or between two

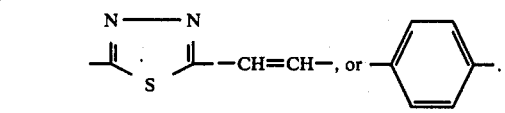

22. An electrophotographic photosensitive member according to claim 21, wherein said hole-transporting material is a compound selected from the group consisting of hydrazones, pyrazolines, oxadiazoles, oxazoles, thiazoles, and triarylmethanes.

23. An electrophotographic photosensitive member according to claim 10, wherein said bond layer contains casein.

24. An electrophotographic photosensitive member characterized by having a conductive support, a charge transport layer, and a charge generation layer which contains at least one disazo pigment represented by the formula:

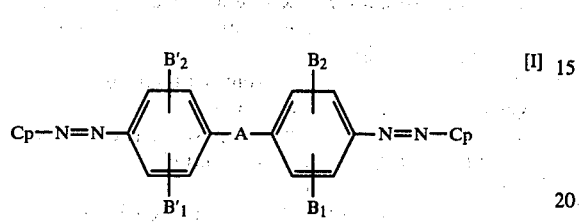

wherein Cp is a coupler residue; $B_1$, $B_2$, $B'_1$, and $B'_2$ are each selected from the group consisting of hydrogen, halogen, lower alkyl, lower alkoxy, acylamino, and hydroxyl; and A is

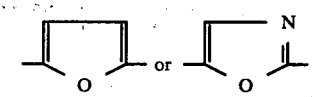

25. An electrophotographic photosensitive member according to claim 24, wherein Cp in formula is a coupler residue of the following formulae (A), (B), (C), or (D):

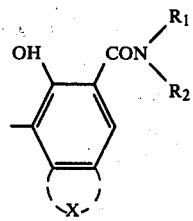
Formula (A)

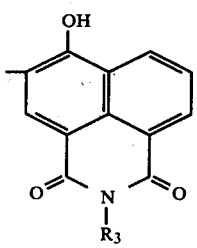
Formula (B)

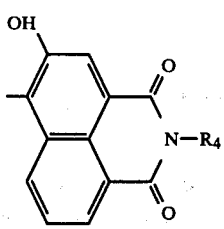
Formula (C)

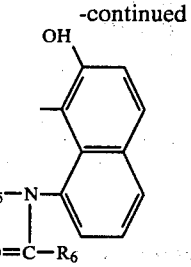
Formula (D)

wherein

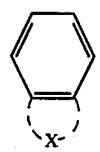

is a naphthalene ring, an anthracene ring, a carbazole ring or a dibenzofuran ring; $R_1$ is hydrogen, substituted or unsubstituted alkyl, or substituted or unsubstituted aryl; and $R_2$, $R_3$, and $R_4$ are substituted or unsubstituted alkyl, substituted or unsubstituted aralkyl, or substituted or unsubstituted aryl; $R_5$ is hydrogen, substituted or unsubstituted alkyl, substituted or unsubstituted aralkyl, or substituted or unsubstituted aryl; and $R_6$ is substituted or unsubstituted aryl.

26. An electrophotographic photosensitive member according to claim 25, wherein $R_1$ in formula (A) is hydrogen.

27. An electrophotographic photosensitive member according to claim 25, wherein the coupler residue represented by formula (D) is

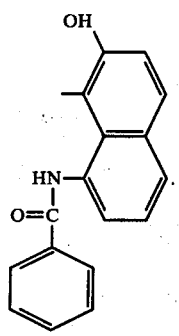

28. An electrophotographic photosensitive member according to claim 24, which has a charge transport layer formed on said charge generation layer.

29. An electrophotographic photosensitive member according to claim 28, which has a laminated structure formed from, in sequence, a conductive layer, a bond layer, said charge generation layer, and said charge transport layer.

30. An electrophotographic photosensitive member according to claim 24, wherein said charge generation layer contains a binder.

31. An electrophotographic photosensitive member according to claim 30, wherein said charge generation layer contains up to 80% by weight of the binder.

32. An electrophotographic photosensitive member according to claim 31, wherein said charge generation layer contains up to 40% by weight of the binder.

33. An electrophotographic photosensitive member according to claim 31, wherein said binder is a poly(vinylbutyral) or polyester resin.

34. An electrophotographic photosensitive member according to claim 24, wherein said charge transport layer contains a hole-transporting material.

35. An electrophotographic photosensitive member according to claim 34, wherein said hole-transporting material is a compound selected from the group consisting of hydrazones, pyrazolines, oxadiazoles, oxazoles, thiazoles, triarylmethanes, and carbazoles.

36. An electrophotographic photosensitive member according to claim 35, wherein the charge transport layer contains at least one pyrazoline compound.

37. An electrophotographic photosensitive member according to claim 35, wherein the charge transport layer contains at least one hydrazone compound.

38. An electrophotographic photosensitive member according to claim 24, wherein said charge transport layer contains an electron-transporting material.

39. An electrophotographic photosensitive member according to claim 38, wherein said electron-transporting material is a fluorenone.

40. An electrophotographic photosensitive member characterized by having a layer containing a hole-transporting material and at least one disazo pigment represented by the formula $$Cp-N=N-\underset{B'_1}{\overset{B'_2}{\underset{|}{\bigcirc}}}-A-\underset{B_1}{\overset{B_2}{\underset{|}{\bigcirc}}}-N=N-Cp \quad [I]$$

wherein Cp is a coupler residue; $B_1$, $B_2$, $B'_1$, and $B'_2$ are each selected from the group consisting of hydrogen, halogen, lower alkyl, lower alkoxy, acylamino, and hydroxyl; and A is $$-\underset{O}{\overset{}{\bigcirc}}- \text{ or } -\underset{O}{\overset{N}{\bigcirc}}-$$

41. An electrophotographic photosensitive member according to claim 40, wherein said hole-transporting material is a compound selected from the group consisting of hydrazones, pyrazolines, oxadiazoles, oxazoles, thiazoles, triarylmethanes, and polyvinylcarbazole.

* * * * *

UNITED STATES PATENT AND TRADEMARK OFFICE
CERTIFICATE OF CORRECTION

PATENT NO. : 4,399,206  
DATED : August 16, 1983  
INVENTOR(S) : KAZUHARU KATAGIRI, ET AL.

Page 1 of 9

It is certified that error appears in the above-identified patent and that said Letters Patent is hereby corrected as shown below:

```
Col. 1, line 18, "place, on" to --place.  On--.
Col. 1, line 19, "disadvantages. For" to --disadvantages, for--.
Col. 1, line 22, "factors, remarkably in" to --factors.  In--.
Col. 1, line 30, "being" to --they are--.
Col. 1, line 32, after "requires" delete --the--.
Col. 1, line 36, "members" to --member--.
Col. 1, line 43, "use actually" to --actually use--.
Col. 1, line 45, "unsuccessfulness" to --failure--.
Col. 5, line 37, after "ethyl" insert --,--.
Col. 7, line 64, "[-VII]" to --[VII]--.
Col. 8, line 66, "polyphophoric" to --polyphosphoric--.
Col. 8, line 66, "hydrozine" to --hydrazine--.
Col. 10, line 14, "diazo" to --disazo--.
Col. 10, line 45, "has" to --was--.
Col. 15, Example 6, Pigment 5,
```

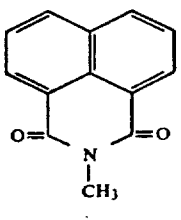 to 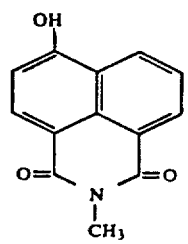

UNITED STATES PATENT AND TRADEMARK OFFICE
CERTIFICATE OF CORRECTION

PATENT NO. : 4,399,206

DATED : August 16, 1983

INVENTOR(S) : KAZUHARU KATAGIRI, ET AL.

It is certified that error appears in the above-identified patent and that said Letters Patent is hereby corrected as shown below:

Col. 20, line 64, "milar" to --mylar--.
Col. 21, line 31, "[II]" to --[III]--.
Col. 27, Example 35, Pigment 33, under $B_1^*$, $B_2^*$,

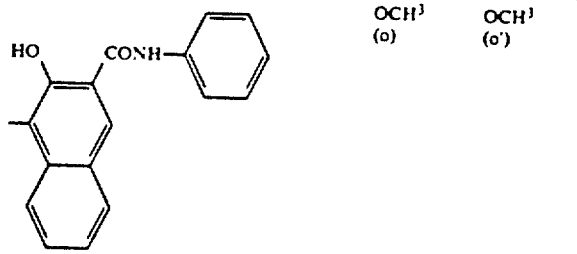

to

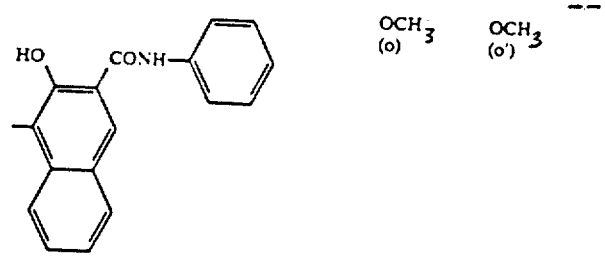

UNITED STATES PATENT AND TRADEMARK OFFICE
CERTIFICATE OF CORRECTION

PATENT NO. : 4,399,206  Page 3 of 9
DATED : August 16, 1983
INVENTOR(S) : KAZUHARU KATAGIRI, ET AL.

It is certified that error appears in the above-identified patent and that said Letters Patent is hereby corrected as shown below:

Col. 33, Example No. 50, Pigment No. 45,

" 50    45         CH₃         H    H    H    H    "

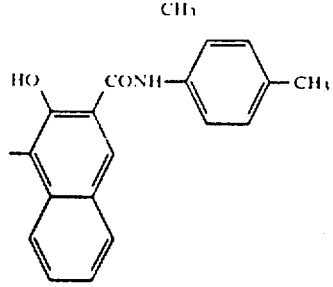

to

-- 50    45         CH₃         H    H    H    H    --.

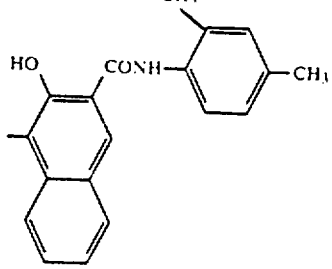

UNITED STATES PATENT AND TRADEMARK OFFICE
CERTIFICATE OF CORRECTION

PATENT NO. : 4,399,206

DATED : August 16, 1983

INVENTOR(S) : KAZUHARU KATAGIRI, ET AL.

It is certified that error appears in the above-identified patent and that said Letters Patent is hereby corrected as shown below:

Col. 45, Example No. 84, Pigment No. 77,

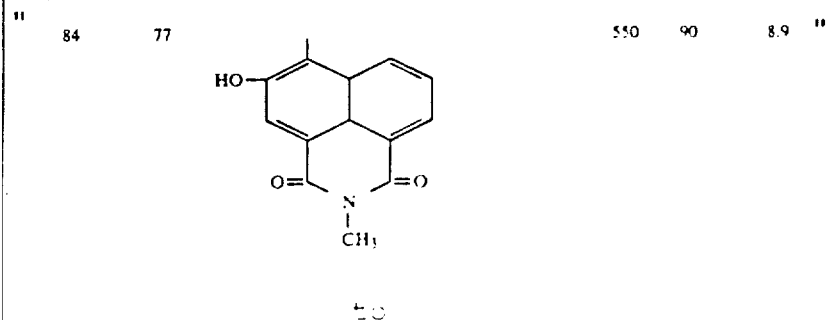

to

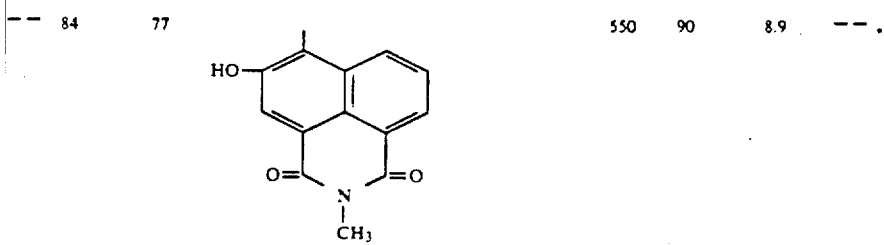

UNITED STATES PATENT AND TRADEMARK OFFICE
CERTIFICATE OF CORRECTION

PATENT NO. : 4,399,206  Page 5 of 9

DATED : August 16, 1983

INVENTOR(S) : KAZUHARU KATAGIRI, ET AL.

It is certified that error appears in the above-identified patent and that said Letters Patent is hereby corrected as shown below:

Col. 67, Example No. 140, Pigment No. 130,

" 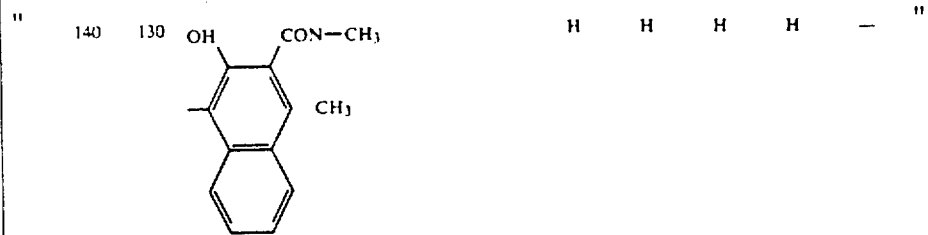   H  H  H  H  —  "

to

-- 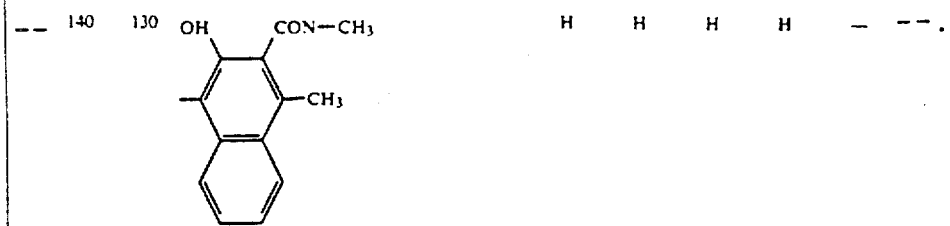   H  H  H  H  —  --.

UNITED STATES PATENT AND TRADEMARK OFFICE
CERTIFICATE OF CORRECTION

PATENT NO. : 4,399,206

DATED : August 16, 1983

INVENTOR(S) : KAZUHARU KATAGIRI, ET AL.

It is certified that error appears in the above-identified patent and that said Letters Patent is hereby corrected as shown below:

Col. 67, Example No. 141, Pigment No. 131,

" 141  131  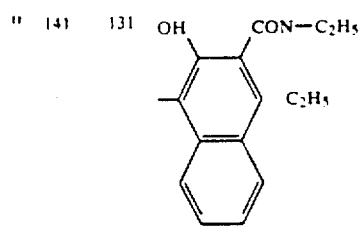     H  H  H  H  —  "

to

-- 141  131  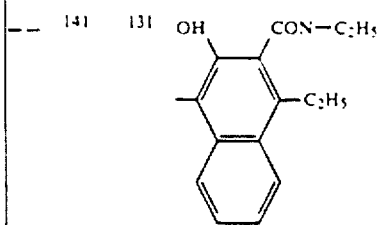     H  H  H  H  —  --.

UNITED STATES PATENT AND TRADEMARK OFFICE
CERTIFICATE OF CORRECTION

PATENT NO. : 4,399,206

DATED : August 16, 1983

INVENTOR(S) : KAZUHARU KATAGIRI, ET AL.

It is certified that error appears in the above-identified patent and that said Letters Patent is hereby corrected as shown below:

Col. 69, Example 145, Pigment No. 135,

" 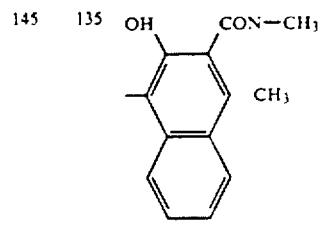    H  H  H  H   —CH=CH— "

to

-- 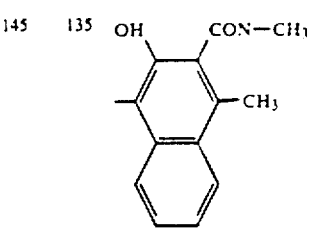    H  H  H  H   —CH=CH— --.

UNITED STATES PATENT AND TRADEMARK OFFICE
CERTIFICATE OF CORRECTION

PATENT NO. : 4,399,206

DATED : August 16, 1983

INVENTOR(S) : KAZUHARU KATAGIRI, ET AL.

It is certified that error appears in the above-identified patent and that said Letters Patent is hereby corrected as shown below:

Col. 71, Claim 1, line 10,

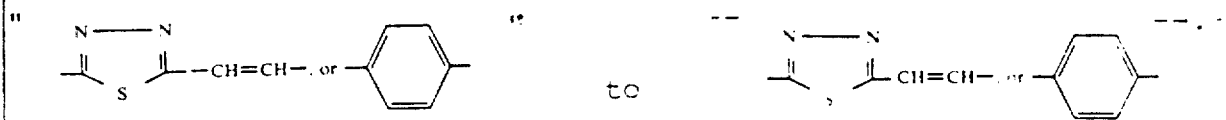

Col. 72, Claim 6, line 59,

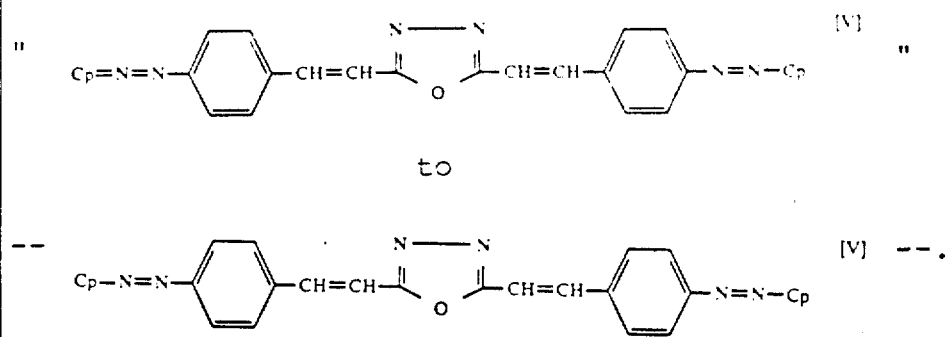

UNITED STATES PATENT AND TRADEMARK OFFICE
CERTIFICATE OF CORRECTION

PATENT NO. : 4,399,206

DATED : August 16, 1983

INVENTOR(S) : KAZUHARU KATAGIRI, ET AL.

It is certified that error appears in the above-identified patent and that said Letters Patent is hereby corrected as shown below:

Col. 74, Claim 21, line 40,

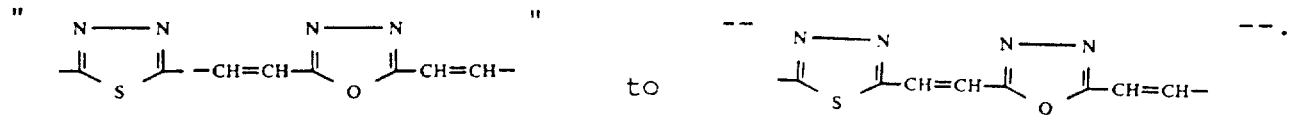

Col. 74, Claim 21, line 62,

Col. 75, Claim 25, line 2, after "Formula" insert --[I]--.

Signed and Sealed this

Fourteenth Day of February 1984

[SEAL]

Attest:

Attesting Officer

GERALD J. MOSSINGHOFF

Commissioner of Patents and Trademarks